(12) United States Patent
Dotzler et al.

(10) Patent No.: US 9,107,235 B2
(45) Date of Patent: Aug. 11, 2015

(54) APPARATUS AND METHOD FOR SCHEDULING TRANSMISSION RESOURCES TO USERS SERVED BY A BASE STATION USING A PREDICTION OF RATE REGIONS

(71) Applicant: NTT DOCOMO, Inc., Chiyoda-ku, Tokyo (JP)

(72) Inventors: Andreas Dotzler, Munich (DE); Wolfgang Utschick, Munich (DE); Guido Dietl, Munich (DE); David Neumann, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 244 days.

(21) Appl. No.: 13/774,564

(22) Filed: Feb. 22, 2013

(65) Prior Publication Data
US 2013/0225220 A1 Aug. 29, 2013

(30) Foreign Application Priority Data
Feb. 24, 2012 (EP) .................................... 12156837

(51) Int. Cl.
*H04B 7/00* (2006.01)
*H04W 72/12* (2009.01)
*H04W 24/02* (2009.01)

(52) U.S. Cl.
CPC ...... *H04W 72/1242* (2013.01); *H04W 72/1226* (2013.01); *H04W 24/02* (2013.01); *H04W 72/1247* (2013.01)

(58) Field of Classification Search
CPC .......................... H04W 72/1247; H04W 24/02
USPC ......... 455/509, 511, 512, 515, 500, 517, 514, 455/450, 451, 452.1, 452.2, 445, 5, 61, 455/552.1, 553.1, 550.1, 422.1, 403, 426.1, 455/426.2, 453; 370/328, 329, 330, 337, 370/338, 343, 346, 347
See application file for complete search history.

(56) References Cited

U.S. PATENT DOCUMENTS

| 6,745,044 B1 | 6/2004 | Holtzman et al. |
| 2004/0038658 A1* | 2/2004 | Gurelli et al. ............... 455/226.3 |
| 2011/0055653 A1 | 3/2011 | Shirani-Mehr et al. |

FOREIGN PATENT DOCUMENTS

| CN | 1855757 A | 11/2006 |
| CN | 101567834 A | 10/2009 |
| EP | 1971167 A1 | 9/2008 |

(Continued)

OTHER PUBLICATIONS

Agrawal, Rajeev et al., "Optimality of Certain Channel Aware Scheduling Policies," In 40th Annual Allerton Conf. Communications, Control, and Computing, Monticello, Illinois, USA, Oct. 2002, pp. 1532-1541.

(Continued)

*Primary Examiner* — Keith Ferguson
(74) *Attorney, Agent, or Firm* — Brinks Gilson & Lione

(57) ABSTRACT

An apparatus for scheduling transmission resources to users served by a base station equipped with a plurality of antennas includes a predictor for predicting rate regions for one or more future time slots based on rate regions for one or more past time slots to obtain one or more predicted rate regions, and a processor for calculating the transmission resources for the users for a current time slot using scheduled transmission resources for the one or more past time slots, a rate region for the current time slot and the one or more predicted rate regions.

16 Claims, 22 Drawing Sheets

(56) References Cited

FOREIGN PATENT DOCUMENTS

| EP | 2073463 A1 | 6/2009 |
|---|---|---|
| WO | WO 2012/016187 A2 | 2/2012 |

OTHER PUBLICATIONS

Bang, Hans Jørgen et al., "Channel Predictive Proportional Fair Scheduling," IEEE Transactions on Wireless Communications, vol. 7(2), Feb. 2008, pp. 482-487.

Bender, Paul et al., "CDMA/HDR: A Bandwidth-Efficient High-Speed Wireless Data Service for Nomadic Users," IEEE Communications Magazine, vol. 38(7), Jul. 2000, pp. 70-77.

Bertsekas, Dimitri P., "A unifying polyhedral approximation framework for convex optimization," SIAM Journal on Optimization, vol. 21(1), 2011, pp. 333-360.

Eryilmaz, Atilla et al., "Fair Resource Allocation in Wireless Networks using Queue-length-based Scheduling and Congestion Control," In 24th Annual Joint Conference of the IEEE Computer and Communications Societies 2005 Proceedings, vol. 3, Mar. 2005, pp. 1794-1803.

Georgiadis, Leonidas, "Resource Allocation and Cross-Layer Control in Wireless Networks," Foundations and Trends® in Networking, vol. 1, No. 1, 2006, 146 pages.

Hajipour, Javad et al., "Proportional Fair Scheduling in Multi-Carrier Networks Using Channel Predictions," In 2010 IEEE International Conference on Communications (ICC), IEEE, May 2010, 5 pages.

Hohenbalken, Balder Von, "Simplicial Decomposition in Nonlinear Programming Algorithms," Mathematical Programming, North-Holland Publishing Company, vol. 13, 1977, pp. 49-68.

Holloway, Charles A., "An extension of the Frank and Wolfe method of feasible directions," Mathematical Programming, North-Holland Publishing Company, vol. 6, 1974, pp. 14-27.

Jalali, A. et al., "Data Throughput of CDMA-HDR a High Efficiency-High Data Rate Personal Communication Wireless System," In IEEE 51st Vehicular Technology Conference Proceedings (VTC 2000-Spring), vol. 3, IEEE, 2000, pp. 1854-1858.

Jose, Jubin et al., "Distributed Rate Allocation for Wireless Networks," IEEE Transactions on Information Theory, vol. 57, Issue 10, Published Oct. 2011, 39 pages.

Kelly, FP et al., "Rate control for communication networks: shadow prices, proportional fairness and stability," Journal of the Operational Research Society, vol. 49(3), Mar. 1998, pp. 237-252.

Kim, Hoon et al., A Proportional Fair Scheduling for Multicarrier Transmission Systems. IEEE Communications Letters, vol. 9(3), Mar. 2005, pp. 210-212.

Knopp, R., "Information capacity and power control in single-cell multiuser communications," In IEEE International Conference on Communications (ICC 1995), vol. 1. IEEE, Jun. 1995, pp. 331-335.

Kushner, Harold J., "Convergence of Proportional-Fair Sharing Algorithms Under General Conditions," IEEE Transactions on Wireless Communications, vol. 3(4), Jul. 2004, pp. 1250-1259.

Lau, Vincent K. N., "A Proportional Fair Space Time Scheduling for Wireless Communications," IEEE Transactions on Communications, vol. 53(4), 2005, p. 747 (Abstract).

Lee, Suk-Bok et al., "Proportional Fair Frequency-Domain Packet Scheduling for 3GPP LTE Uplink," In 28th Conference on Computer Communications (IEEE INFOCOM 2009), IEEE, Apr. 2009, pp. 2611-2615.

Liu, Xin et al., "Opportunistic Transmission Scheduling With Resource-Sharing Constraints in Wireless Networks, IEEE Journal on Selected Areas in Communications," vol. 19, No. 10, Oct. 2001, pp. 2053-2064.

Min, Tae-young et al., "Multi-Phase Predictive Proportional Fairness Scheduling for a Multi-Channel Wireless Packet System," in IEEE 18th International Symposium on Personal, Indoor and Mobile Radio Communications (PIMRC 2007), IEEE, Sep. 2007, 5 pages.

Sahin, Gokhan, "Predictive Scheduling in Rate-Adaptive Multi-User Relay Channels with Reconfiguration Delays," $29^{th}$ IEEE International Conference on Distributed Computing Systems Workshops, 2009, pp. 517-522.

Sahin, Gokhan et al., "Predictive Scheduling in Multi-Carrier Wireless Networks with Link Adaptation," In IEEE 60th Vehicular Technology Conference (VTC2004-Fall), vol. 7, IEEE, Sep. 2004, 5015-5020.

Schmidt, Jorge F., "Prediction based resource allocation in OFDMA," In 45th Annual Conference on Information Sciences and Systems (CISS 2011), IEEE, Mar. 2011, 4 pages.

Sesia, Stefania et al, "LTE, The UMTS Long Term Evolution: From Theory to Practice," Wiley, Apr. 2009, 87 pages.

Shirani-Mehr, Hooman et al., "Channel State Prediction, Feedback and Scheduling for a Multiuser MIMO-OFDM Downlink," In 42nd Asilomar Conference on Signals, Systems and Computers, IEEE, Oct. 2008, pp. 136-140.

Stolyar, Alexander L., "On the Asymptotic Optimality of the Gradient Scheduling Algorithm for Multiuser Throughput Allocation," Operations Research, vol. 53(1), Jan. 2005, pp. 12-25.

Tse, David N.C. et al., "Multiaccess Fading Channels—Part I: Polymatroid Structure, Optimal Resource Allocation and Throughput Capacities," IEEE Transactions on Information Theory, vol. 44(7), Nov. 1998, pp. 2796-2815.

Viswanath, Pramod et al., "Opportunistic Beamforming Using Dumb Antennas," IEEE Transactions on Information Theory, vol. 48(6), Jun. 2002, pp. 1277-1294.

Zhang, Ying Jun (Angela) et al., "Proportional Fairness in Multi-Channel Multi-Rate Wireless Networks—Part II: The Case of Time-Varying Channels with Application to OFDM Systems," IEEE Transactions on Wireless Communications, vol. 7(9), Sep. 2008, pp. 3457-3467.

Chinese Office Action translated to English, pp. 1-8, dated May 5, 2015, issued in Chinese Patent Application No. 201310056505.5, State Intellectual Property Office of the People's Republic of China, Beijing, China.

European Office Action, dated May 27, 2015, pp. 1-6, issued in European Patent Application No. 12156837.2, European Patenta Office, Munich, Germany.

* cited by examiner

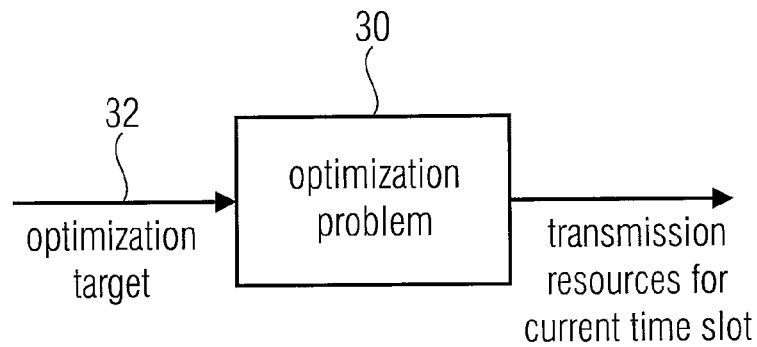

maximize $U(\tilde{r}[t])$      ~34
$\tilde{r}[t]$ subject to $\tilde{r}[t] \in \tilde{R}[t]$.

$$\tilde{r}^*[t] = \underbrace{\sum_{b=t-B_t}^{t-1} w_b r[b]}_{\text{past time slots}} + \underbrace{w_t r^*[t]}_{\text{current time slot}} + \underbrace{\sum_{p=t+1}^{t-P_t} w_p r^*[p]}_{\substack{\text{future time slots} \\ \text{(virtual - are} \\ \text{recalculated} \\ \text{in next step)}}}, \quad \text{~33}$$

proportional fairness utility U:

$$U(\tilde{r}) = \sum_{k \in K} \log(\tilde{r}_k). \quad \text{~35}$$

gradient method for proportional fairness utility $$r[t] = \arg\max \nabla U(\tilde{r}[t])^T r.$$

$$\nabla U(\tilde{r}_k[t]) = \frac{\partial \log(r_k)}{\partial \tilde{r}_k[t]} = \frac{1}{\tilde{r}_k[t]}, \quad \text{~36}$$

weight $\nabla U$ for user k is inverse proportional
to user k's rate ⟶ high rate: low weight

FIG 3 maximize $\lambda^T r$
r subject to $r \in R$

Weighted Sum-Rate Maximization
(WSRMax) can be used to find
a point on the boundary of $R$.

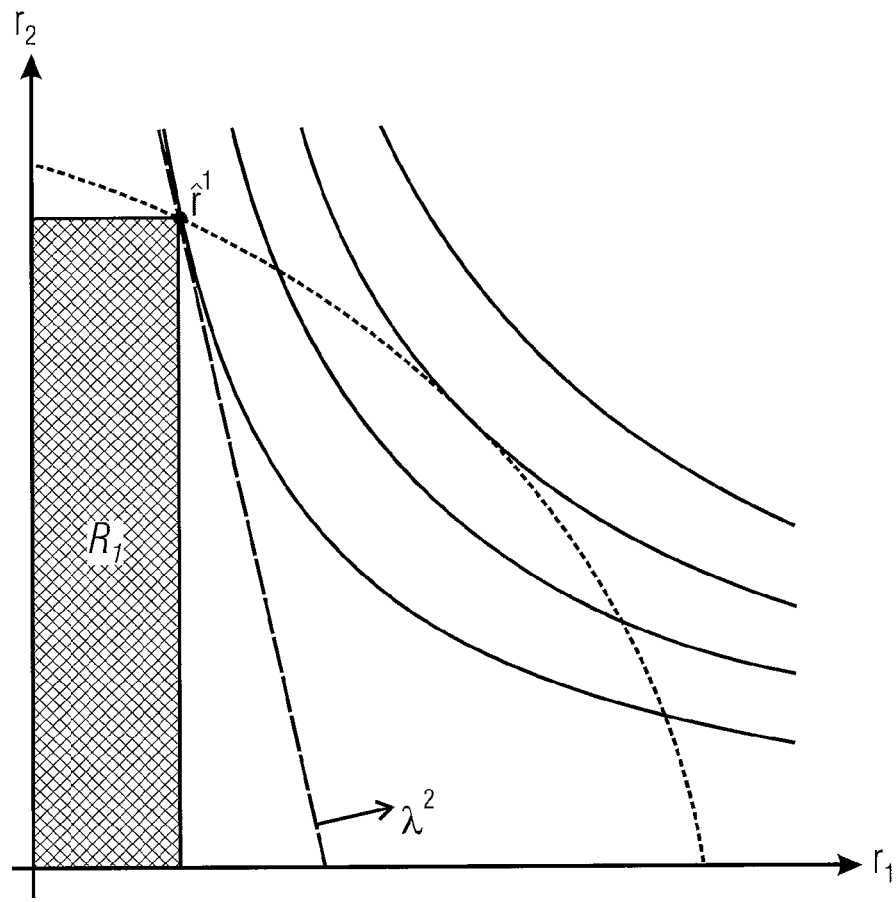
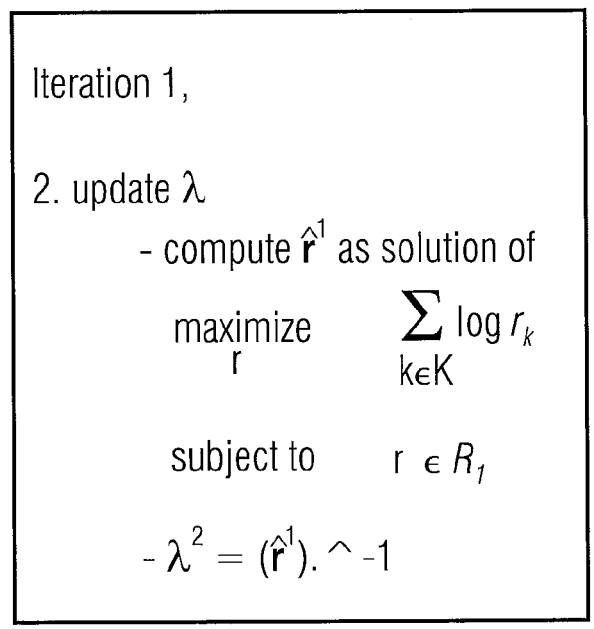
FIG 4E

Iteration 2, 2. update $\lambda$
- compute $\hat{r}^2$ as solution of $$\underset{r}{\text{maximize}} \quad \sum_{k \in K} \log r_k$$

$$\text{subject to} \quad r \in R_2$$

- $\lambda^3 = (\hat{r}^2).\wedge -1$

```
i = 1
Initialize λᵢ
while not converged do
    r*ᵢ = argmax {U(r) - λᵢᵀr}
           r≥0
    c*ᵢ = argmax {λᵢᵀc}
           c∈R
    d(λᵢ) = U(r*ᵢ) - λᵢᵀ(r*ᵢ - c*ᵢ)
    Dual variable update, use d(λᵢ), r*ᵢ, c*ᵢ to calculate λᵢ₊₁
    i = i+1
    Covergence check
end
```

Primal-Dual Algorithm

FIG 5

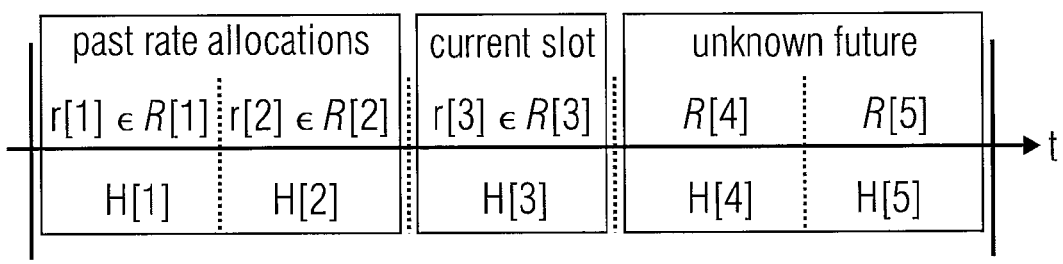

average throughput can not be optimized directly:
- rate allocations of the past r[1], r[2] can not be changed
- future channels H[4], H[5] are unknown
- channels H[3] of current timeslot are known
- only the rates r[3] ∈ R[3] in the current timeslot can be allocated

FIG 6

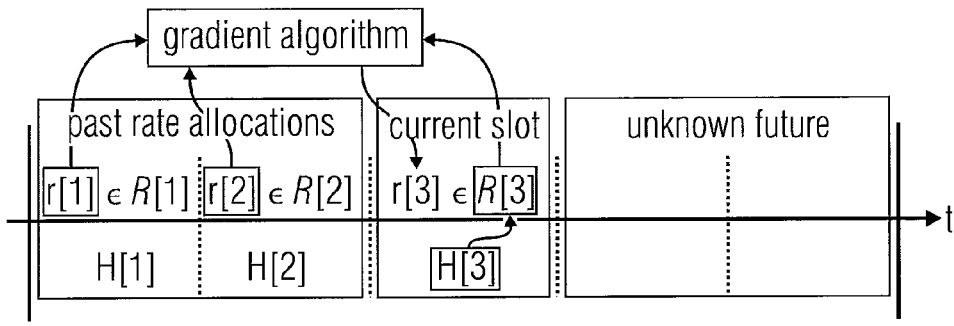

state-of-the art solution: gradient algorithm
- asymptotically optimal selection rule (long term average)
- drastic performance degradation for finite windows length or sliding window

FIG 7A

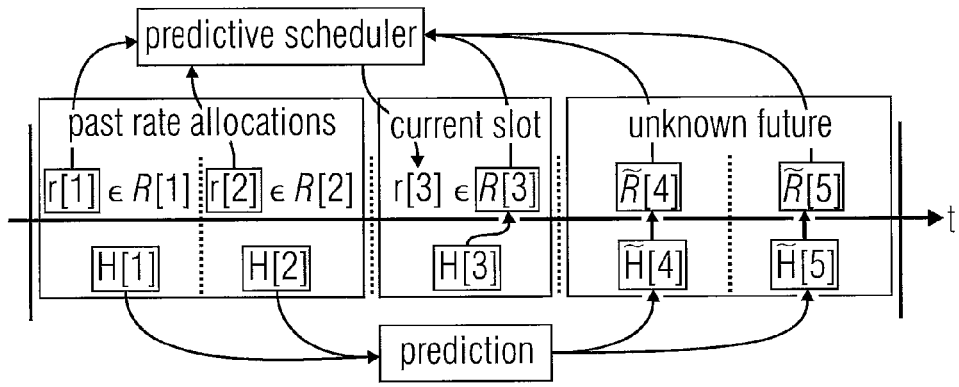

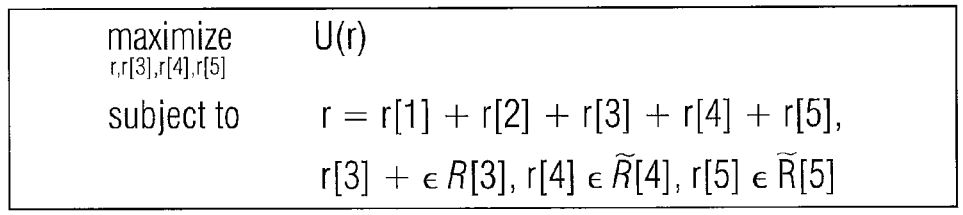

- solution $r^* = r[1] + r[2] + r^*[3] + r^*[4] + r^*[5]$
- rate configuration for current timeslot: $r^*[3]$
- problems with MIMO channel prediction
- high complexity (complex mapping of channel state to rate region)

FIG 7B

- solution $r^* = r[1] + r[2] + r^*[3] + r^*[4] + r^*[5]$
- rate configuration for current timeslot: $r^*[3]$
- solution by inner approximation of rate regions $\widetilde{R}[i] \subseteq R[i]$
- use inner approximations for prediction in the rate space Predictive Scheduling - Advanced Multi-User Systems
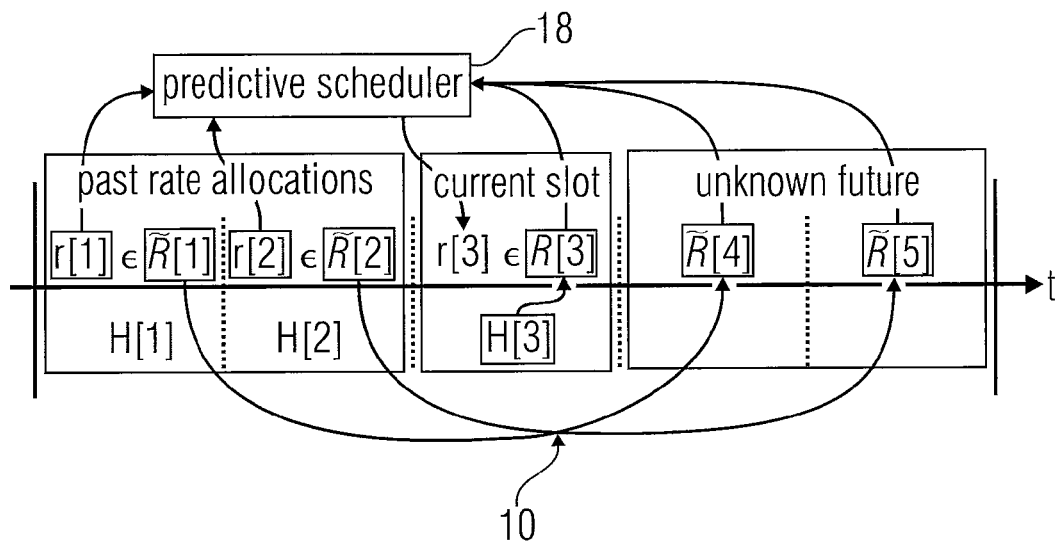
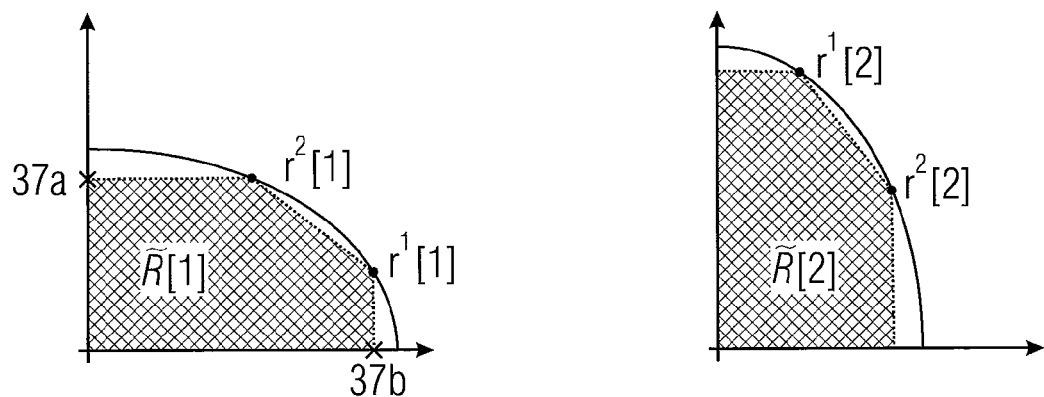
> solution by inner approximation of rate regions $\tilde{R}[i] \subseteq R[i]$
> use inner approximations for prediction in the rate space
FIG 8B

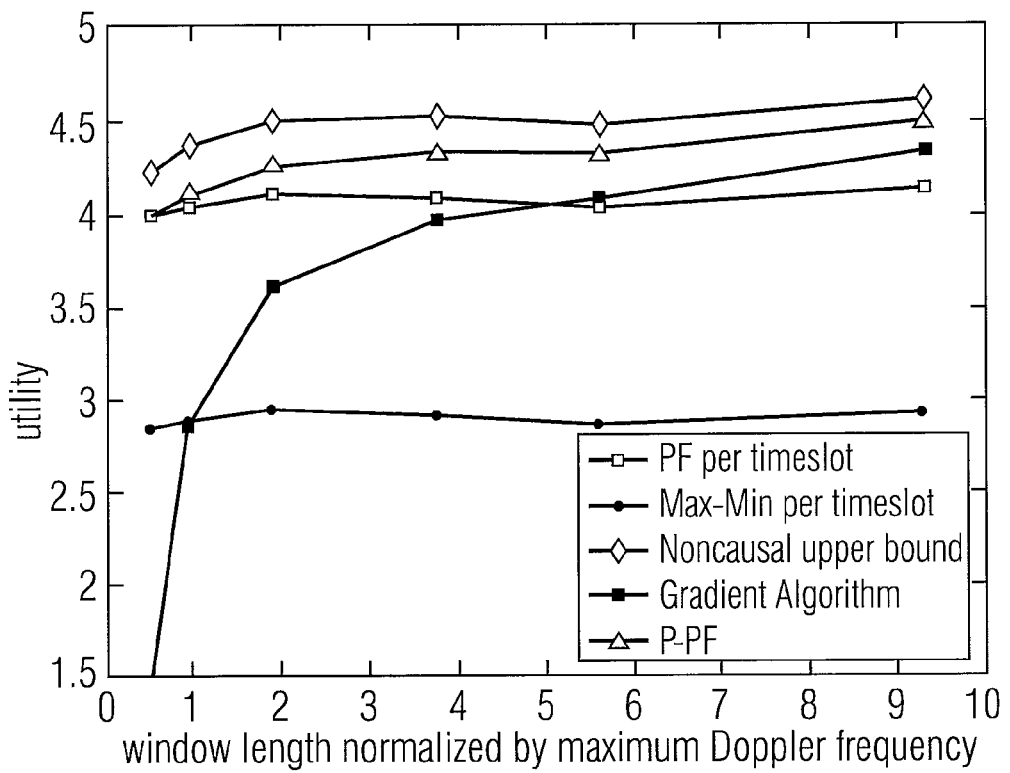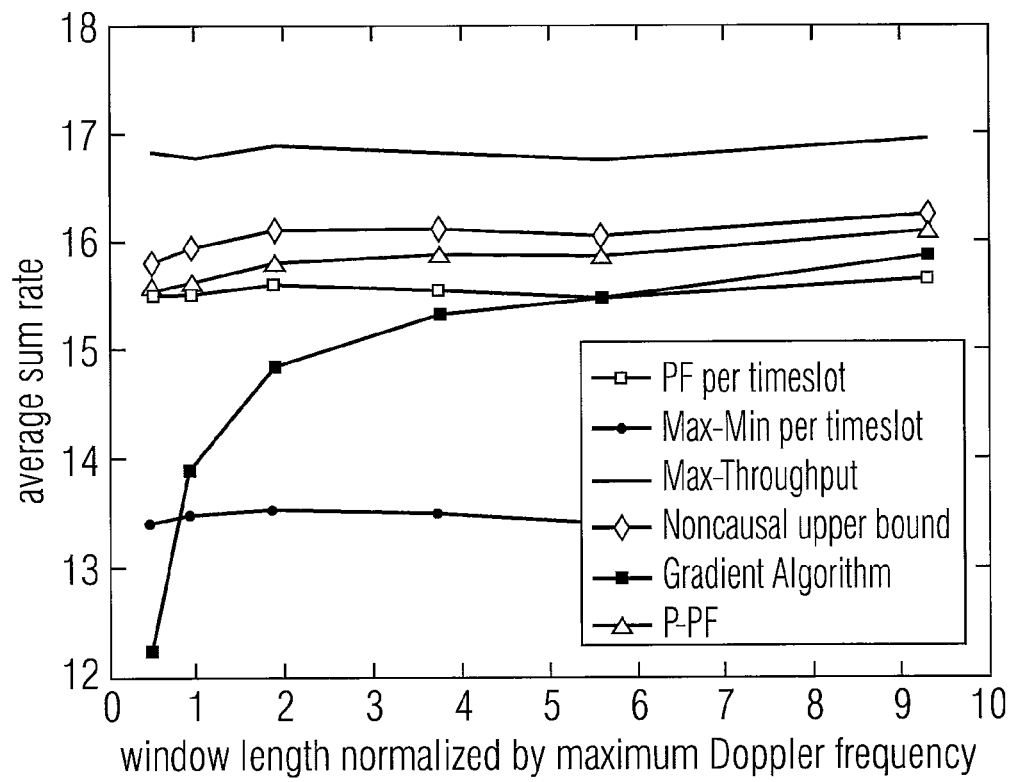
FIG 9B

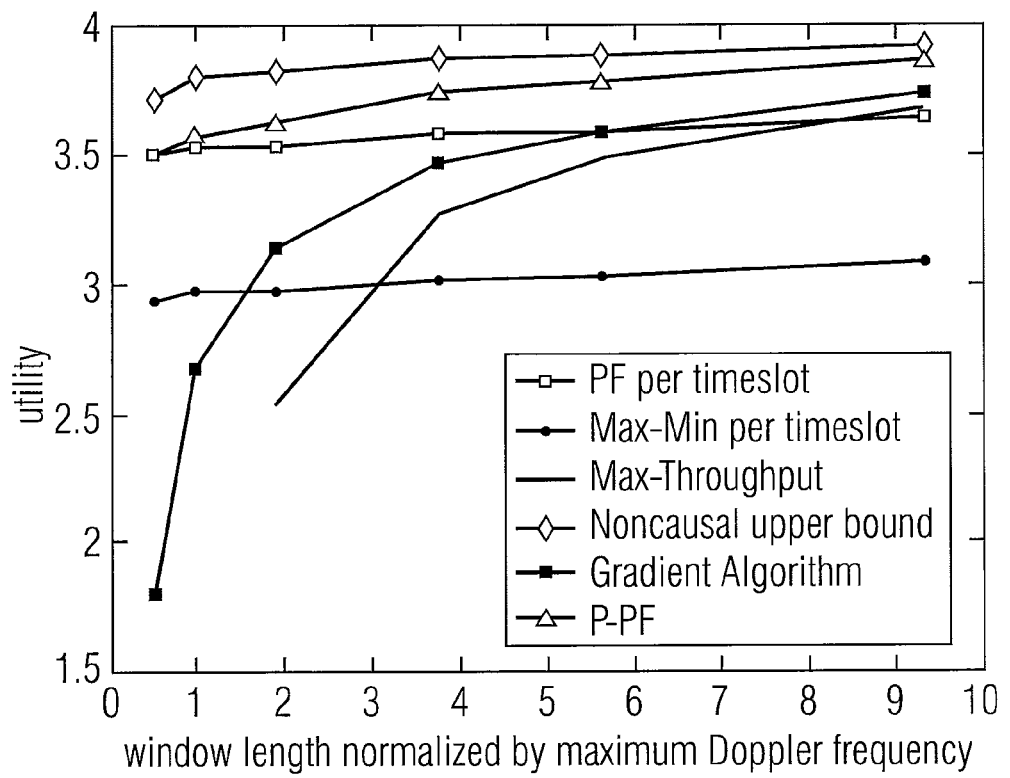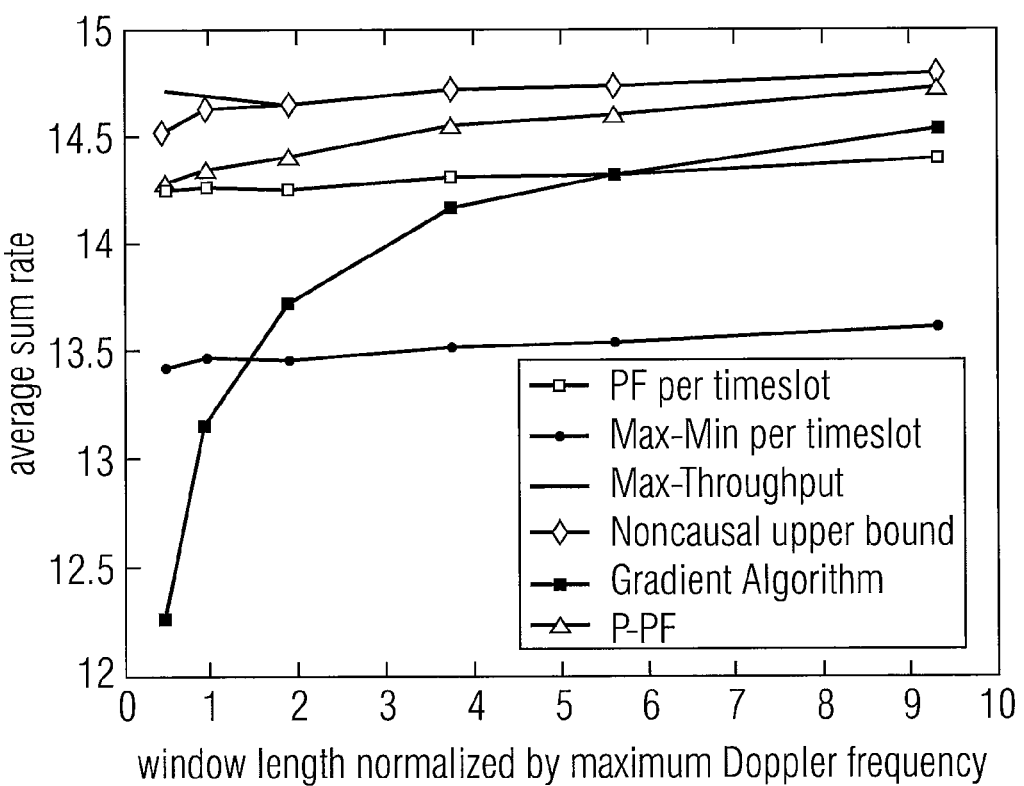
FIG 9C

- sequence of weighted sum-rate optimizations is solved by the simplicial decomposition algorithm

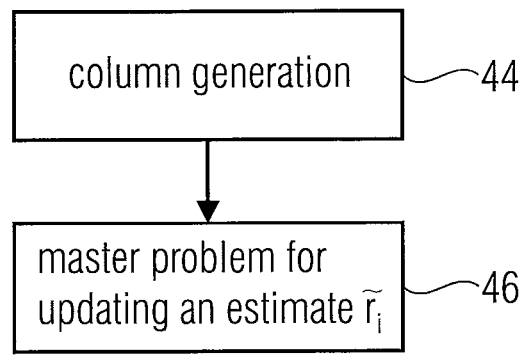

- master problem forms a convex combination of the previously formed columns and the new column $$\tilde{c}_i \in \underset{\tilde{c} \in \tilde{R}[t]}{\operatorname{argmax}} \nabla U(\tilde{r}_i)^T \tilde{c},$$

- weighted sum-rate maximization (WSR maxim.) master problem:

$$\underset{\tilde{r}_i}{\operatorname{maximize}} \ U(\tilde{r})$$

$$\text{subject to } \tilde{r}_i \in \operatorname{co} \{\tilde{c}_1,...,\tilde{c}_i\},$$

(convex hull can be parameterized)

FIG 10A

- use an individual inner approximation of all rate regions, master problem is:

$$\text{maximize}_{\chi} \quad U(\tilde{r}_i)$$

$$\text{subject to} \quad \tilde{r}_i \in \sum_{r=t-B_t}^{t-1} w_r\{r[\tau]\} + w_t R_i[t] + \sum_{r=t+1}^{t+P_t} w_r \sum_{r'=0}^{t} a_{rr'} R_i[\tau']$$

- column generation step enlarges the inner approximations

- WSR maximization in decoupled into a subproblem for each rate region $$c_i^*[t] \in \underset{c_i[t] \in R[t]}{\text{argmax}} \{\nabla U(\tilde{r}_i)^T r\}$$

- update of inner approximation of $R[\tau']$ $$c_i^*[\tau'] \in \underset{c_i[\tau'] \in R[\tau']}{\text{argmax}} \{\nabla U(\tilde{r}_i)^T r\},$$

FIG 10B

Average Weighted Throughput

- Exponential Moving Average $$\tilde{r}[T] = \frac{1}{t_c} \sum_{t=0}^{T-1} \left(1 - \frac{1}{t_c}\right)^t r[T-t] = \left(1 - \frac{1}{t_c}\right) \tilde{r}[T-1] + \frac{1}{t_c} r[T]$$

- Sliding Window $$\tilde{r}[T] = \frac{1}{W} \sum_{t=T-W}^{T-1} r[T-t] = \tilde{r}[T-1] - \frac{1}{W} r[T-1-W] + - \frac{1}{W} r[T]$$

- Fixed Window $$\tilde{r}[T] = \frac{1}{T} \sum_{t=0}^{T-1} r[T-t] = \left(1 - \frac{1}{T}\right) \tilde{r}[T-1] + \frac{1}{T} r[T]$$

FIG 10C

APPARATUS AND METHOD FOR SCHEDULING TRANSMISSION RESOURCES TO USERS SERVED BY A BASE STATION USING A PREDICTION OF RATE REGIONS

RELATED APPLICATIONS

This application claims priority under 35 U.S.C. §119 to European Patent Application No. 12156837.2 filed on Feb. 24, 2013, the entire content of which is hereby incorporated by reference.

The present invention is related to wireless communication and particularly to the task of resource allocation for transmitters/receivers in a wireless network, where base stations are equipped with a plurality of antennas as used, for example, in MIMO scenarios.

The present invention is related to wireless communications, transmission technologies, proportional fairness allocations, opportunistic resource allocations and predictive scheduling.

BACKGROUND OF THE INVENTION

The demand for higher data rates in wireless communications is ever increasing. Thus, one has to find ways to use the given resources even more efficiently. Gains can be achieved by exploiting temporal variations in the channels due to fading that is independent among the users, so-called multi-user diversity. Opportunistic resource allocation (scheduling) was introduced in [1]. Well recognized work in this field is [2] and [3]; an overview can be found in [4]. The drawback of these schemes, purely aiming at increasing throughput, is the unfairness and starvation of users. So one seeks a balance between maximizing throughput and having a fair resource allocation among the users.

Proportional fairness offers an attractive trade-off between resource efficiency by opportunistically exploiting time-variant channels and the satisfaction of the users. Proportional fair sharing (PFS) was introduced in [5, 6] for the Qualcomm High Data Rates system.

The PFS is designed for a single channel network with TDMA constraint, that is, only one user is allowed to transmit at the same time. An extension to a system with multiple channels, with equal power per carrier, is introduced in [7]. And a similar but less general approach specifically designed for the 3GPP LTE Uplink is [8]. In the following, systems that allow only a single user per resource block are called orthogonal access systems.

Further increase in spectral efficiency for future generation networks is established by advanced physical layer techniques, for example multi-user MIMO. In multi-user systems with adaptive modulation and coding, the data rates of the users are coupled and in theory infinitely many rate configurations can be provided. These systems are referred to as advanced multi-user systems. The complex interdependence of the user rates is a significant difference and unfortunately there is no straight-forward extension of the PFS rule to advanced multi-user systems. A step to design opportunistic and fair resource allocation for multi-user systems is the formulation as an optimization problem; for proportional fairness this is the maximization of the sum of logarithmic average user rates [9]. For the PFS algorithm the interpretation as utility maximization and proof for asymptotic optimality can be found in [10]. To formulate the utility maximization some assumptions and definitions are introduced to describe the system model.

System Model: Slotted time-varying wireless channels are assumed, where the channel is assumed to be static within one time-slot. The channel state H is a random process and H[T] is the channel state realization at time-slot T. A peak power constraint is assumed, which implies that power budgets cannot be exchanged among the time-slots, as for an average power constraint. Depending on the capabilities of the hardware, the set of achievable data rates for the set of users K, K=|K| at time-slot T are given by the rate region R(H[T])=R[T]. The instantaneous rates established in time-slot T are r[T] ▲ R[T]. The weighted sample mean of the data rates is $$\bar{r}[T] = \sum_{t=0}^{T} w_t r[T-t].$$

The weights can be used to establish various definitions of the average throughput, see FIG. 10c. The long-term average rate is $$\bar{r} = \lim_{T \to \infty} \bar{r}[T] = \lim_{T \to \infty} \sum_{t=0}^{T} w_t r[T-t],$$

in case the weights and the stochastic process of the channel states are such that the limit exists. This allows to define a region of long-term average rate regions supported by the physical layer:

$$\bar{R} = \left\{ \bar{r} : \bar{r} = \lim_{T \to \infty} \sum_{t=0}^{T} w_t r[T-t], r[t] \in R[t] \forall t \right\}.$$

With these definitions one can state opportunistic and fair resource allocation as maximizing a utility of the long-term average throughput:

$$\underset{\bar{r}}{\text{maximize}}\, U(\bar{r}) \qquad (1.1)$$

$$\text{subject to } \bar{r} \in \bar{R},$$

where the utility associated with proportional fairness is $U(\bar{r}) = \Sigma_{k \in K} \log(\bar{r}_k)$.

The optimal long-term average throughput $\bar{r}^*$ is the weighted sample mean of the optimal rate allocations $r^*[t] \in R[t]$ in each time-slot. Problem (1.1) is convex in the rate space and can be solved by suitable algorithmic methods. But at time-slot t one has to make a decision for r[t] while the future rate regions R[τ], τ>t are not known and the previously made decisions cannot be altered, i.e., the rate vectors r[τ], τ<t are fixed. Thus, one cannot calculate the optimal average throughput $\bar{r}^*$ to find the optimal rate allocation $r^*[t]$ for the current time-slot.

This means: one cannot optimize the average throughput directly. Instead, one decides for a rate allocation r[t] in each time step, which then automatically results in a certain average throughput.

The goal is to find a close to optimal causal scheduling strategy for any time-slot t which only utilizes information about previously made decisions and previous channel state information which defines the rate regions. Under certain conditions the following policies are asymptotically (T→∞) optimal:

Gradient Method [11, 12] The rate configuration for the current time-slot t is based on maximizing a linear approximation of the utility:

$$r[t] = \underset{r \in R[t]}{\operatorname{argmax}} \Delta U(\bar{r}[t]^T r). \quad (1.2)$$

For the proportional fairness utility we have $$\nabla U(\bar{r}_k[t]) = \frac{\partial \log(r_k)}{\partial \bar{r}_k[t]} = \frac{1}{\bar{r}_k[t]}, \quad (1.3)$$

which leads to the well known PFS rule [5,6] in case of a TDMA constraint, where a single user needs to be selected. Therefore the gradient method can be considered as a generalization of proportional fair sharing for orthogonal access systems to proportional fair resource allocation for advanced multi-user systems.

Stochastic Subgradient Method Another attempt to solve problem (1.1) causally is the stochastic subgradient method. The rate configuration of the current time-slot is $$r[t] = \underset{r \in R[t]}{\operatorname{argmax}} \lambda[t]^T r$$

where λ[t] are the dual variables updated as follows $$a[t] = \underset{a}{\operatorname{argmax}} H(a) - \lambda[t]^T a, \quad (1.3)$$

$$\lambda[t+1] = [\lambda[t] - \alpha(r[t] - a[t])]^+,$$

with a fixed constant α.

Methods from Queuing Theory The task of optimizing a network utility is also considered in the area of queuing networks [13, 14] and virtual queues can be used for allocating resources in a way that leads to an optimal solution with respect to the network utility.

The rate configuration for the current time-slot is $$r[t] = \underset{r \in R[t]}{\operatorname{argmax}} u[t]^T r,$$

where u[t] is the virtual queue updated as follows $$a[t] = \underset{a}{\operatorname{argmax}} \beta U(a) - u[t]^T a, \quad (1.4)$$

$$u[t+1] = [u[t] - r[t] + a[t]]^+,$$

with a fixed constant β.

The work in [15] is mentioned that specifically treats multi-user MIMO, but does consider an average power constraint and can therefore not be applied to the present scenario without major modifications.

The algorithms are memoryless, in the sense that they do not require keeping track of the rate allocations in the past or channel states. Instead, they track a single variable per user, the current average rate, a dual variable, or the queue length, which is cheap to store and simple to update. They assume that the mobile services have a high tolerance for delay and that user positions and activity of users varies only slowly. Establishing long-term fairness by means of the methods described may lead to unacceptable periods without service for some users.

An extreme way to avoid this, is to establish fairness in each of the time-slots, for example for $$r[t] = \underset{r[t] \in R[t]}{\operatorname{argmax}} \left\{ \sum_{k \in K} \log(r_k[t]) \right\}, \quad (1.5)$$

or max-min fairness $$r[t] = \underset{r[t] \in R[t]}{\operatorname{argmax}} \left\{ \underset{k \in K}{\min} \{r_k[t]\} \right\}. \quad (1.6)$$

As the current rate region is known, the maximization can be efficiently solved by suitable methods.

However, establishing a fair resource allocation in each time-slot independently may be too restrictive and lead to a loss in efficiency. Depending on the application, several consequent timeslots without service might be acceptable, but service needs to be provided within a fixed time window. A possible solution is predictive scheduling [16-22].

The idea is that, although they might be erroneous, estimates of future channel states might be beneficial. The resulting schedulers are no more memoryless and in general regard a certain horizon of past rate allocations (look-behind) and predictions of future channel states (look-ahead). For this time frame they maximize a utility or the expectation of the utility over several subsequent (potentially overlapping) time frames. So the gain of predictive scheduling comes at the price of having higher computational complexity.

For orthogonal access systems there is a direct connection between the data rate of the user and the channel state. This is no more true for advanced physical layer techniques, for example MU-MIMO, where by choosing the transmission strategies, for example transmission powers or beamformers, a trade-off between the user rates can be made. State of the art methods for predictive scheduling [16-22] are intended for orthogonal access systems and do not generalize to advanced multi-user systems.

Hence, for complex systems, the well-known methods are either too complex or too computationally expensive or do not result in the optimum solution with respect to a certain utility, such as a fair allocation utility.

SUMMARY OF THE INVENTION

According to an embodiment, an apparatus for scheduling transmission resources to users served by a base station equipped with a plurality of antennas may have: a predictor for predicting rate regions for one or more future time slots based on rate regions for one or more past time slots to acquire one or more predicted rate regions; and a processor for calculating the transmission resources for the users for a current time slot using scheduled transmission resources for the one or more past time slots, a rate region for the current time slot and the one or more predicted rate regions.

According to another embodiment, a method of scheduling transmission resources to users served by a base station equipped with a plurality of antennas may have the steps of: predicting rate regions for one or more future time slots based on rate regions for one or more past time slots to acquire one or more predicted rate regions; and calculating the transmission resources for the users for a current time slot using scheduled transmission resources for the one or more past time slots, a rate region for the current time slot and the one or more predicted rate regions.

According to another embodiment, a computer program may have a program code for performing, when running on a computer, the method of scheduling transmission resources to users served by a base station equipped with a plurality of antennas, which method may have the steps of: predicting rate regions for one or more future time slots based on rate regions for one or more past time slots to acquire one or more predicted rate regions; and calculating the transmission resources for the users for a current time slot using scheduled transmission resources for the one or more past time slots, a rate region for the current time slot and the one or more predicted rate regions.

The present invention is based on the finding that a predictor for predicting the rate regions for one or more future time slots based on rate regions for one or more past time slots is used to obtain one or more predicted rate regions. Then, the processor for calculating the transmission resources for the users for a current time slot uses the scheduled transmission resources for the past one or more time slots, a rate region determined for the current time slot and the one or more predicted rate regions output by the predictor.

Therefore, in contrast to estimating the channel gains for the next time slots, the present invention relies on estimating the rate regions rather than the channel gains for the future time slots. Particularly for the advanced multi-user systems, where advanced physical layer techniques are used such as multi-user MIMO, the channel gains cannot be directly translated into rate regions. Particularly for multi-user systems with adaptive modulation and coding, the data rates of the users are coupled and in theory infinitely many rate configurations can be provided. Hence, for such advanced multi-user systems, the complex interdependence of the user rates is a significant difference and therefore the present invention does not rely on the prediction of channel gains, but on the prediction of rate regions in order to shortcut the problem of translating channel gains for future time slots into rate regions for future time slots. Due to the fact that any prediction of channel gains are not required anymore in accordance with the present invention, one does not have to predict channels anymore. In a preferred embodiment, an opportunistic and/or fair resource allocation for multi-user systems is reduced to the formulation as an optimization problem. For proportional fairness, this system maximizes the sum of logarithmic average rates in an example. For the proportional fair sharing algorithm, the interpretation as utility maximization and proof for asymptotic optimality is existent. Hence, for scenarios where the direct connection between channel gains for next time slots and a prediction of the rate regions no longer exist, the present invention can nevertheless provide an improved asymptotic optimum solution for the scheduling of transmission resources. Particularly for advanced multi-user systems, by choosing the transmission strategies, for example transmission powers or beamformers, a trade-off between the user rates can be made. Statistical models of the channels might not be available and prediction methods require additional computational resources. Actually, in accordance with the present invention, one is not interested in the actual channel realizations in the future time slots, while in preferred embodiments a prediction of channels in the current time slot may be used to improve the quality of a delayed channel feedback. Instead, in accordance with the present invention, one is interested in the resulting user rates achievable in the future. Even if one could accurately predict the channels, it is not clear if one would invest the computational complexity that is useful for incorporating the channel prediction. The rate region prediction, however, does not require a channel prediction and the complex translation from predicted channels into predicted rate regions.

The present invention therefore relies on the prediction of the achievable user rates instead of predicting channels. For the prediction of rate regions, the information of the rate regions observed so far which can be given by the channel state information are used and it is assumed that these observations are representative of the future. Depending on the implementation, one prediction concept is based on the complete description of the previous rate regions which means the channel state information has to be stored and/or the past rate regions have to be stored. A further concept is based on inner approximations of previous rate regions, which drastically reduces memory requirements and allows for a specific implementation.

Further embodiments have a strong focus on cellular networks with base station cooperation, where a major concern is to keep the coordination overhead low. This means that an exchange of channel state information and/or channel state predictions should be avoided. For this scenario, particularly the concept based on the inner approximations may be specifically attractive, as the approximations are of much lower dimensionality, simple to exchange in a standardized way and lead to implementations with small coordination overhead.

For the predictive scheduling, the true average rate region is replaced by an approximation that depends on past allocations and the prediction. The number of past (look-behind) and future (look-ahead) time slots to be considered in the approximation can be configured and their influence can be adjusted by weights in preferred embodiments. The rate allocations of the previous time-slots cannot be changed and are assumed to be fixed. The current rate region is known, however the rate regions for the future time slots are not known and are therefore replaced by predictions. Under these assumptions, the rate allocation in the current time slot can be found by solving an optimization problem relying on past resource allocations, predicted rate regions and the current rate region for the current time slot.

In preferred embodiments, this optimization problem is implemented using the simplicial decomposition algorithm. This algorithm is modified to inner approximate all known rate regions that constitute the approximated rate region individually instead of inner approximating the estimated rate region. This has several advantages. As the problem has to be solved in every time-step, the inner approximations of the past time-slots can be reused.

These inner approximations are preferably directly used as representation of the old rate regions to form a prediction of future rate regions. Hence, it is avoided to store the much higher dimensional channel state information, although this would be possible as well. This is particularly important for multi-cell scenarios, where multiple base stations are coordinated and the exchange of channel state information should be avoided. Instead, it is preferred to consider distributed solutions with minor overhead that exchange the inner approximations (or some information derived from these), where the information exchange could be standardized to allow for interoperability.

Preferred embodiments of the present invention therefore provide an efficient concept for the prediction of rate regions, a predictive multi-user scheduler and/or an efficient implementation of the scheduler and the prediction.

The present invention provides a response to the ever increasing demand for higher data rates in wireless communications. Particularly, for opportunistic resource allocation or advanced physical layer techniques such as multi-user MIMO, the present invention is specifically advantageous. An efficient operation of a wireless network requires a balance between maximizing throughput and having a fair rate allocation among the users. Establishing long-term fairness by state of the art may lead to unacceptable periods without service, which can be avoided by predictive scheduling. Known methods for predictive scheduling are not applicable to advanced physical layer techniques with adaptive modulation and coding. Hence, the present invention relies on a predictive scheduler for advanced multi-user communication systems.

In other words, the prediction of the rate regions for future time slots allows that one can handle the requirement for fair allocation in an efficient way. For example, when a certain user is located quite far apart from the base station, this user typically does not have a very good transmission channel. Hence, this user will not get a high data rate or a high number of transmission resources under the scenario of optimizing the maximum throughput. However, the other requirement for fair allocation will increase the weight for this user more and more, i.e. over each time slot where the user again got a quite small number of transmission resources. By increasing the weights for this user, however, a situation will come where the scheduler actually schedules an increasing number of transmission resources to this user in order to fulfill the fairness requirement. However, this will result in a reduction of the overall throughput, since the allocation to the user with a not very good channel heavily affects the other users with good channels, which are situated more closely to the base station. Now, the present invention allows to "play" with the future of this channel. When there is a trend which is picked up by the prediction, which shows in the direction that the user is coming closer to the base station or the rate region where this user is located improves over time, a decision can be found saying that even though the user's weights actually force the resource allocator to now give this user a channel, to actually not do this for the current time slot or the future time slot, but probably for the next future time slot where the prediction indicates that the user is getting a better channel than before. Hence, the present invention allows that the transmission resource allocation actually waits one or more future time slots until the user is provided with more transmission resources in the hope of or with the help of the prediction that the user's channel will increase in the future and therefore the maximum throughput is higher as if the user would have been scheduled transmission resources even though the user had a bad channel. Hence, the prediction of rate regions allows to not only acknowledge the past and the current situation, but also the future situation and depending on the time extension of the prediction, i.e. how many future time slots are predicted, an optimum compromise between complexity, maximum overall throughput and fair allocation is obtained.

BRIEF DESCRIPTION OF THE DRAWINGS

Embodiments of the present invention will be detailed subsequently referring to the appended drawings, in which:

FIG. 3 illustrates a preferred implementation of the processor performing an optimization problem;

FIGS. 4A-4I illustrate a preferred iterative algorithm for allocating resources in a graphic representation to be used for the weighted sum rate maximization;

FIG. 5 illustrates a straightforward primal-dual algorithm;

FIG. 6 illustrates a scenario for which the present invention provides a solution;

FIGS. 7A and 7B illustrate pre-stages for explaining the present invention;

FIG. 8B illustrates a more detailed procedure based on the solution by inner approximation of rate regions;

FIGS. 9A-9C illustrate the performance gain obtained by the present invention in simulation scenarios;

FIGS. 10A and 10B illustrate a preferred implementation using the simplicial decomposition algorithm; and FIG. 10C illustrates different ways for defining an average weighted throughput.

DETAILED DESCRIPTION OF THE PREFERRED EMBODIMENTS

Figure 1:
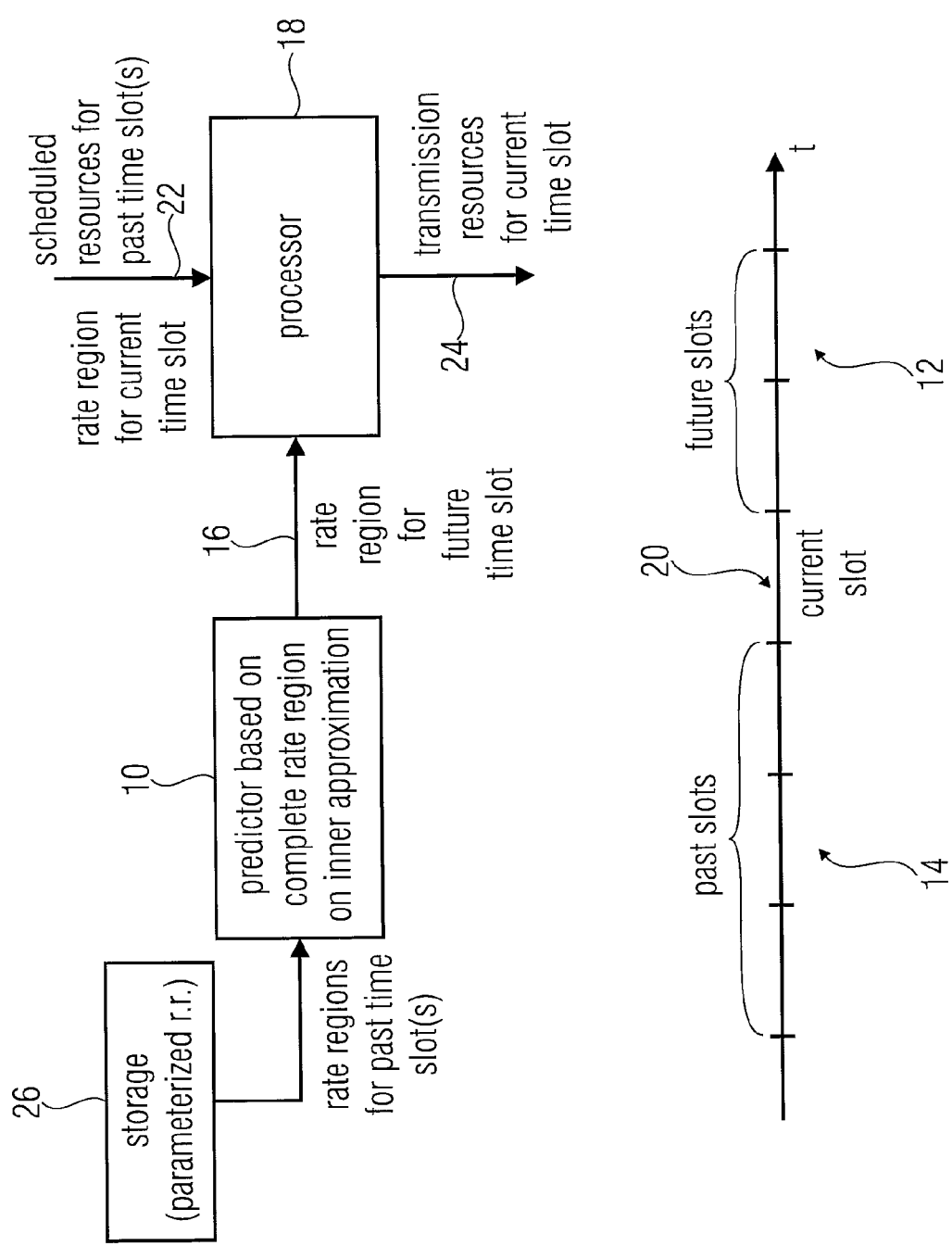
FIG. 1 illustrates a block diagram of an inventive apparatus for scheduling transmission resources to users.

FIG. 1 illustrates an apparatus for scheduling transmission resources to users served by a base station equipped with a plurality of antennas in accordance with a preferred embodiment.

Figure 2:
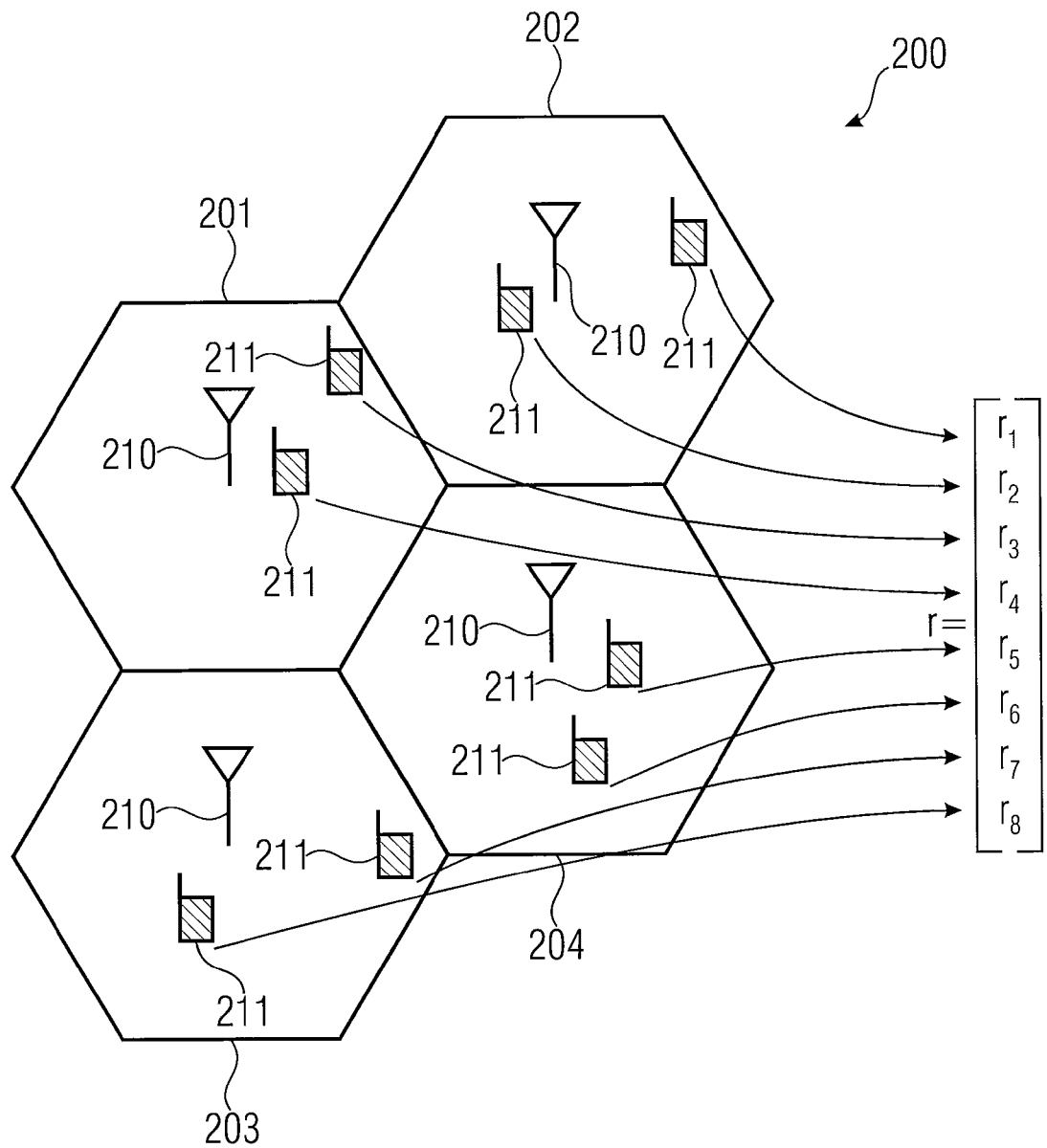
FIG. 2 illustrates a rate assignment for users in a downlink transmission for a multi-user multi-cell cooperative multi-point transmission (CoMP) multiple input-multiple output (MIMO) system.

Base stations are, for example, illustrated in FIG. 2 at 210 and users associate with base stations are illustrated in FIG. 2 at 211. Particularly, each of the base stations 210 in FIG. 2 is equipped with a plurality of antennas in order to obtain an MIMO scenario. Furthermore, the users 211 of FIG. 2 can have one or a plurality of different antennas. When the users 211 themselves have a plurality of antennas, more complex beamforming scenarios can be formed compared to the situation where only base station 210 has a plurality of antennas and each user only has a single antenna.

Furthermore, FIG. 2 illustrates a cellular system where there are several cells 201 to 204, and each base station serves the users associated with the cell, in which the base station is placed. However, in accordance with the present invention not only an allocation within a single cell is made possible, but also an allocation within a plurality of cells is obtained so that the interdependence or inter-influence between the cells is acknowledged and used in the calculation as well. As outlined in FIG. 2, a maximization of the throughput, i.e. of the sum of the logarithmic rates of the individual users k, is obtained with the condition (subject to) that the rate vector r is within the rate region R. The present invention provides an improved concept for calculating a solution to this optimization problem. Particularly, the inventive apparatus comprises a predictor 10 for predicting rate regions for one or more future time slots indicated at 12 in FIG. 1 based on rate regions for one or more past time slots indicated at 14 in FIG. 1 to obtain one or more predicted rate regions, i.e. rate regions for one or more future time slots output on line 16. Line 16 connects the predictor 10 and a processor 18 for calculating the transmission resources for the users for a current time slot 20 using scheduled transmission resources for the one or more past time slots represented by rate regions for the past time slots or the actually scheduled transmission resources or channel conditions of the past and as input into the processor 18 by line 22. Furthermore, the processor additionally relies on a rate region for the current time slot and of course on the rate region for one or more future time slots provided on line 16. The processor 18 outputs the calculated transmission resources for the users for the current time slot on line 24.

The predictor 10 has an associated storage 26 for storing preferably parameterized rate regions from the past in a particularly efficient implementation. However, the storage 26 may store other representations of past allocations, but it is preferred to actually store either parameterized or non-parameterized rate regions from the past in order to generate from these rate regions from the past the rate regions for the one or more future time slots.

FIG. 3 illustrates a more detailed implementation of the processor 18. Particularly, the processor 18 is configured to solve an optimization problem 30. To this end, the optimization problem relies on an optimization target 32 and the optimization problem provides, when it has been solved, the transmission resources for the current time slot. In a preferred implementation, the optimization target depends on the weighted or unweighted sum of the transmission resources from the one or more past time slots, the current time slot and the one or more future time slots. Particularly, the weighted or unweighted sum of the transmission resources from the past, the current and the future time slots is illustrated at 33, and this sum is used as the condition of the maximization algorithm illustrated at 34. As can be seen from equation 33, the number "$B_t$" defines the number of past time slots to be used, and the number "$P_t$" indicates the number of future time slots to be used in the optimization problem.

Preferably, a proportional fairness utility U is used as illustrated in FIG. 3 at items 35 and 36. Particularly, the maximization of the utility is performed so that the utility is defined by a logarithm of a sum of the transmission resources for the one or more past time slots, i.e. each user's transmission resources are subject to the logarithmic function and the results are summed up. However, other utilities such as a non-logarithmic utility or any other weighted utility can be used as well.

Furthermore, in order to assure fairness, the users are provided with weights as indicated at 36. As can be seen in the lower equation of item 36, the weights are inverse proportional to the user k' rate. If the user received a higher rate in the past, the user will receive a low weight for the future and alternatively, if the user k received a low rate for the past, the user will receive a high weight. The weight influences the optimization problems solution so that users with high weights are preferred over users with low weight. This procedure makes sure that a certain user which has never received a high number of transmission resources in the past receives an even more increasing weight and at some in time the weight will he so high that the user is preferred over other users, although allocation of resources to this user violates the (unweighted) utility at 35, which is based on a maximization of the individual rates.

Predictive scheduling for orthogonal access systems, is based on estimating the channel gains for the next times-slots, which directly provides a prediction of the rates. This direct connection is not given for advanced multi-user systems.

Prediction of Rate Regions:

For the prediction of the rate regions one uses information (the channel states) of the so far observed rate regions $R[0], \ldots, R[t]$ and assume that these observations are representative for the future. There are two specific methods to predict the rate region $\tilde{R}[p]$ of a future time-slot $p > t$ (the weighted sum of sets is defined as $$\sum_{n=1}^{N} a_n S_n := \left\{ s : s = \sum_{n=1}^{N} a_n s_n, s_n \in S_n \forall n \right\} \right) :$$

prediction based on complete rate regions $$\tilde{R}[p] = \sum_{\tau'=0}^{t} a_{p\tau'} R[\tau']$$

prediction based on inner approximation $$\tilde{R}[p] = \sum_{\tau'=0}^{t} a_{p\tau'} R_I[\tau'],$$

where $R_I[\tau'] \subseteq R[\tau']$ is an inner approximation formed by the convex hull of boundary points of $R[\tau']$.

The approximation weights $a_{p\tau'}$ can be used to adjust the influence of the past rate regions. A typical choice of the weights is to perform an average of a certain number of past rate regions but other choices, for example matched to the statistical properties and/or expected estimation errors, are possible.

Predictive Multi-User Scheduler:

For the predictive scheduling the true average rate region is replaced by an approximation. Based on the prediction we can define an approximate rate region $$\tilde{R}[t] = \left\{ \tilde{r}[t] : \tilde{r}[t] = \sum_{b=t-B_t}^{t-1} w_b r[b] + w_t r[t] + \sum_{p=t+1}^{t+P_t} w_p r[p], \right.$$

$$\left. r[t] \in R[t], r[p] \in \tilde{R}[p] \forall p \right\}.$$

The variables $B_t$ and $P_t$ configure how many of the past (look-behind) and future (look-ahead) time-slots are considered in the approximation. The rate allocations $r[t+1], \ldots, r[t-B_t]$ of the $B_t$ previous time-slots cannot be changed and are assumed to be fixed. The rate region $R[t]$ is known. However, the rate regions of the $P_t$ future time-slots are not known and are therefore replaced by predictions $\tilde{R}[t+1], \ldots, \tilde{R}[t+P_t]$. The influence of each time-slot on the performance can be adjusted by the weights $w_\tau$, $\tau = t-B_t, \ldots, t+P_t$, and are usually chosen to match the definition of the average throughput considered. Under these assumptions the rate allocation in the current time-slot $r[t] \in R[t]$ can be found by solving an optimization problem:

$$\underset{\tilde{r}[t]}{\text{maximum}} \quad U(\tilde{r}[t]) \tag{1.7}$$

$$\text{subject to} \quad \tilde{r}[t] \in \tilde{R}[t].$$

Contrary to problem (1.1) problem (1.7) can be solved casually. Given a solution $$\tilde{r}^*[t] = \sum_{b=t-B_t}^{t-1} w_b r[b] + w_t r^*[t] + \sum_{p=t+1}^{t+P_t} w_p r^*[p],$$

one obtains the rate configuration for the current time-slot: $r[t]=r^*[t]$. Pit is noted that the rate allocations calculated for future time-slots are only virtual and will be recalculated in the next time-slot.

Subsequently, reference is made to FIGS. 10a and 10b in order to illustrate an efficient implementation of equation (1.7).

Efficient Implementation:

Problem (1.7) is typically solved by a sequence of weighted sum-rate optimizations, for ex-ample the simplicial decomposition algorithm [23, 24]. The simplicial decomposition algorithm consists of two steps, the column generation 44 and a master problem 46 for updating an estimate $\tilde{r}_i$ of the optimal solution. The master problem forms a convex combination of the previously generated columns and the new column to improve the estimate. The column generation in the i-th step is $$\tilde{c}_i \in \underset{\tilde{c} \in \tilde{R}[t]}{\operatorname{argmax}} \nabla U(\tilde{r}_i)^T \tilde{c}, \qquad (1.8)$$

i.e., one solves a weighted sum-rate (WSR) maximization. The master problem is $$\begin{aligned}\underset{\tilde{r}_i}{\operatorname{maximum}} \quad & U(\tilde{r}) \\ \text{subject to} \quad & \tilde{r}_i \in co\{\tilde{c}_1, \dots \tilde{c}_i\},\end{aligned} \qquad (1.9=$$

and the solution provides the update for the estimate $\tilde{r}_i$. The master problem has simple constraints (the convex hull can be explicitly parameterized) and can be solved by standard methods for mathematical programming.

In the following, a more efficient solution method is provided, considering that similar problems are solved for several consequent time-slots. We use a generalized version of the simplicial decomposition method, see [25] for details. The algorithm uses an individual inner approximation of all rate regions involved, these can be any subset of all so far observed rate regions $R[0], \dots, R[t]$. Any combination of the inner approximations $R_I[0], \dots, R_I[t]$ provides again a valid inner approximation, and we can therefore use the following master problem:

$$\begin{aligned}\underset{x}{\operatorname{maximize}} \quad & U(\tilde{r}_i) \\ \text{subject to} \quad & \tilde{r}_i \in \sum_{\tau=t-B_t}^{t-1} w_\tau \{r[\tau]\} + w_t R_I[t] + \sum_{\tau=t+1}^{t+P_t} w_\tau \sum_{\tau'=0}^{t} a_{\tau\tau'} R_I[\tau'],\end{aligned} \qquad (1.10)$$

In the column generation step one enlarges the inner approximations. Due to the linearity of the objective, the WSR maximization in (1.8) can be decoupled into a subproblem per rate region involved. The solution is a weighted sum of the optimizers in each rate region. The enlargement of the inner approximation RI[t] of the current rate region R[t] is found by $$c_i^*[t] \in \underset{c_i[\tau'] \in R[t]}{\operatorname{argmax}} \{\nabla U(\tilde{r}_i)^T r\}$$

In case the prediction based on complete rate regions is used, we also update the inner approximation of $R[\tau'] \forall \tau'=0, \dots, t-1$ by $$c_i^*[\tau'] \in \underset{c_i[\tau'] \in R[\tau']}{\operatorname{argmax}} \{\nabla U(\tilde{r}_i)^T r\}, \qquad (1.11)$$

but only if $R[\tau']$ is relevant for the prediction, that is $\Sigma_{p=t+1}^{t+P_t} a_{p\tau} < 0$. In case of inner approximations being used for the prediction, using (1.11) would obviously not enlarge the approximation.

One has to consider that the master problem is very similar for several consequent time-slots, as the weights may change, but the inner approximations stay valid. This can be used to provide a more efficient implementation, by reusing previous inner approximations. In fact, this is also the intuition behind the prediction based on inner approximation. In this case one does not use the previous rate regions but the inner approximations obtained while running the simplicial decomposition algorithm. This means the column generation step operates only on the current rate region R[t]. Therefore, the complexity of the predictive algorithm is roughly the same as fairness per slot, given by (1.5) or (1.6), that also require multiple WSR maximizations and a master problem. It is however higher than for the memoryless algorithms that solve a single WSR maximization and have a closed form update for the variables they track.

Considering a multi-cell network, exchanging inner approximations of rate regions might be used to obtain a distributed solution for base station cooperation with minor overhead.

Subsequently, reference is made again to FIG. 2. FIG. 2 illustrates a problem to which the present invention can be applied. A problem scenario comprises several cells 201, 202, 203, 204, where each cell comprises a base station 210 and several mobile terminals 211. Now, the problem to be solved is that each mobile terminal 211 should receive a certain transmission resource such as a transmission rate, a number of frequency channels, a number and size of time slots, frequency slots, code slots or spatial channels. Specifically, the wireless situation is so that all mobile terminals 211 in a sense influence each other, and this mutual interdependence is typically described by the achievable rate region R which is, for example, assumed to be a convex set, although this is not necessary for the invention. The rate region R is constituted by the physical layer techniques, for example MIMO transmission and channel realizations. This problem can be solved by the dual decomposition and the dual problem is solved by the primal-dual algorithm as illustrated in FIG. 5. Particularly, a fair rate allocation is required which means that it should be made sure that no user receives a zero resource and that, overall, the resource is maximized. Stated differently, when the user 211 which is in a certain cell should receive a maximum rate then this would mean that other transmitters in the neighborhood of this strong transmitter can only have a small rate, but the total overall rate could be higher when both transmitters obtain a quite similar rate. However, this finally depends on the different transmission channels, the physical layer and so on. However, the rates of the users need to be proportionally fair allocated to achieve high throughput, also for cell-edge users and, thus, a high user satisfaction for all users. Since typically no explicit description of the rate region R is available, the iterative algorithm, as illustrated in FIG. 5, is used. In this process, an iteration is performed, in which a solution of the weighted sum rate problem according to the current dual variables (weights) is computed and the dual variables are updated as long as the solution is not optimum.

Subsequently, reference is made to FIGS. 4A to 4I in order to illustrate a weighted sum-rate maximization which is preferably used by the processor relying on the average rate region defined by the past time slots, the current time slots and the predictions of the future time slots.

Figure 4A:
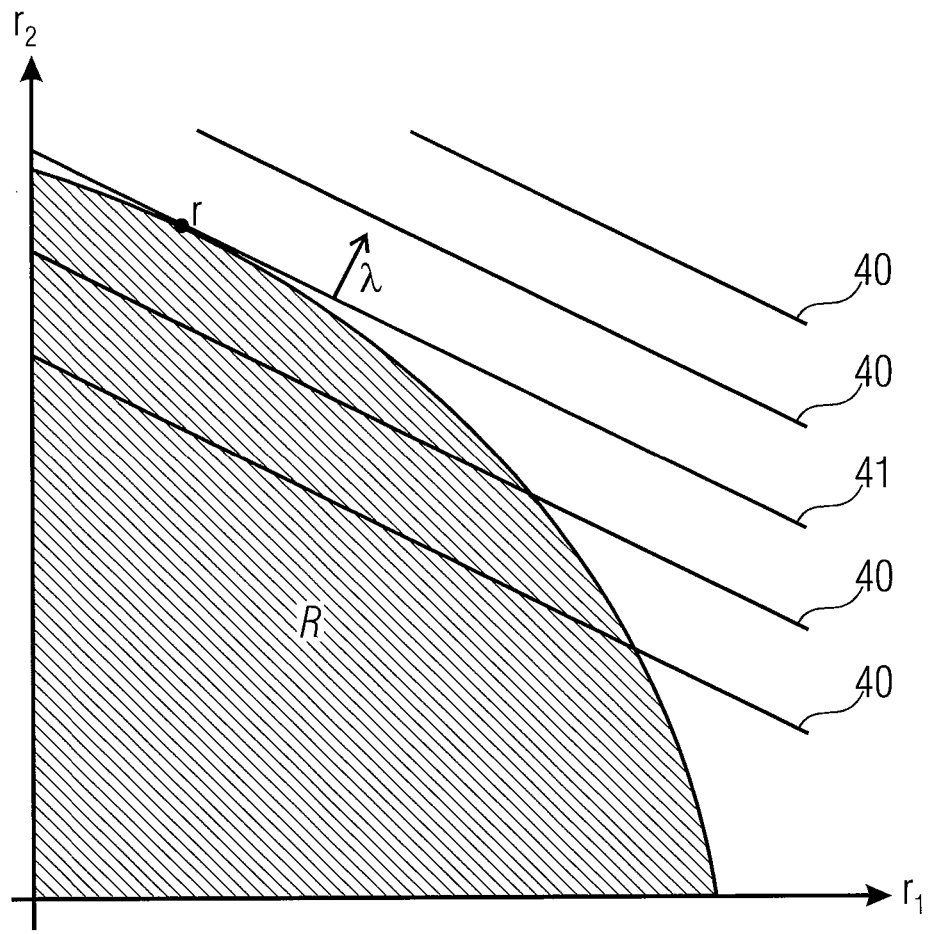

FIG. 4A illustrates a weighted sum-rate maximization (WSRMax) which can be used to find the point on the boundary of R, where R is the so-called achievable rate region R which is a representation of all the physical parameters and transmission channels etc. A product of λ multiplied by r is to be maximized subject to the fact that the rates are within the admissible rate region. As can be seen in FIG. 4A, there exist straight lines 40, where the specific straight line 41 touches the rate region at a certain point and the vector defined by the iteration resource weights λ is orthogonal to line 41.

Figure 4B:
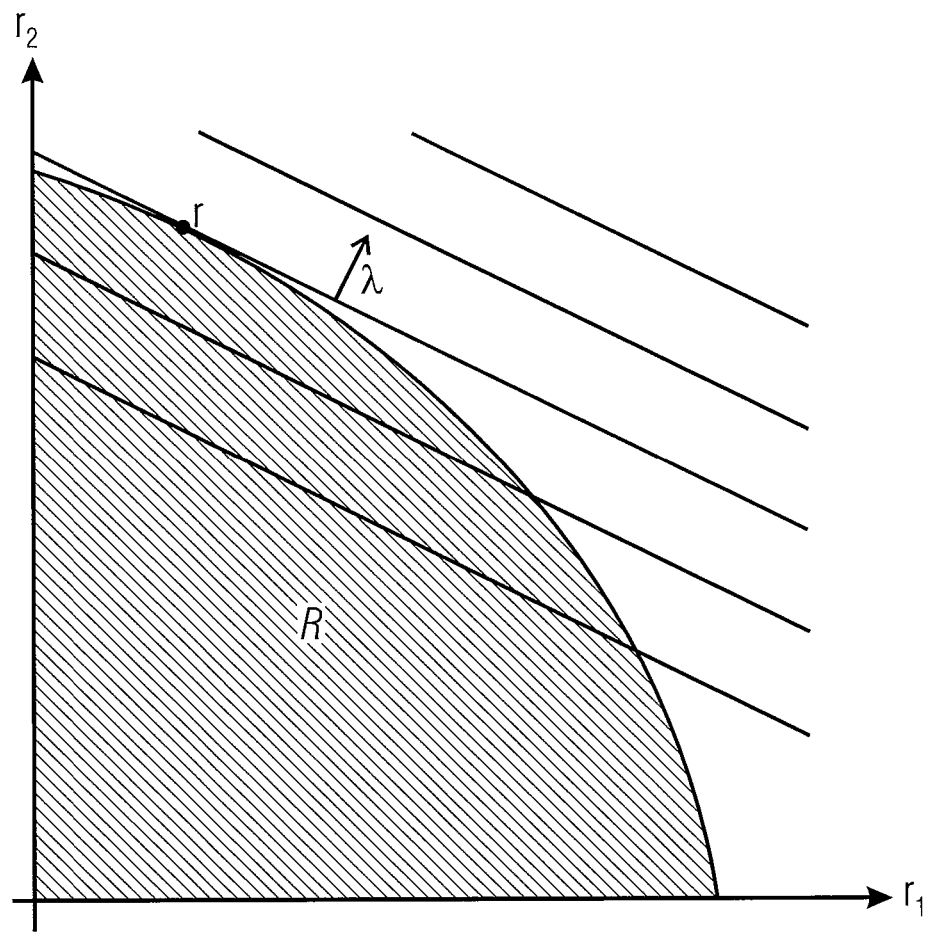

FIG. 4B illustrates the iterative algorithm in a slightly different representation compared to FIG. 6. Specifically, the update step 2 is indicated which is performed subsequent to the weighted sum rate maximization with λ as an argument. Specifically, FIG. 4B illustrates an iterative exploration of the rate region and the cost per iteration are given by the optimization problem, WSRMax and the required signaling among all transmitters when updating λ. The main goal is to drastically reduce the number of iterations.

Figure 4C:
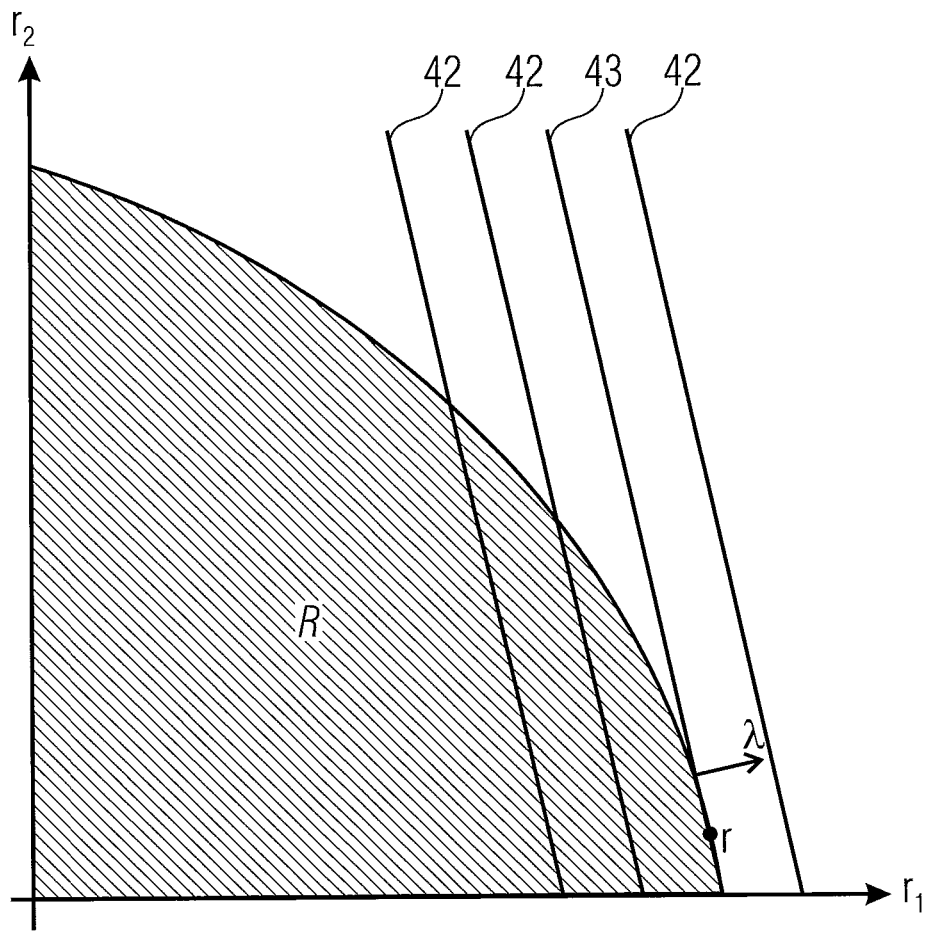

FIG. 4C illustrates another iterative exploration of the rate region where the different lines 42 have a different inclination with respect to FIG. 4A and where line 43 touches the rate region border at the resources allocation result r and λ is again orthogonal to the line 43.

Figure 4D:
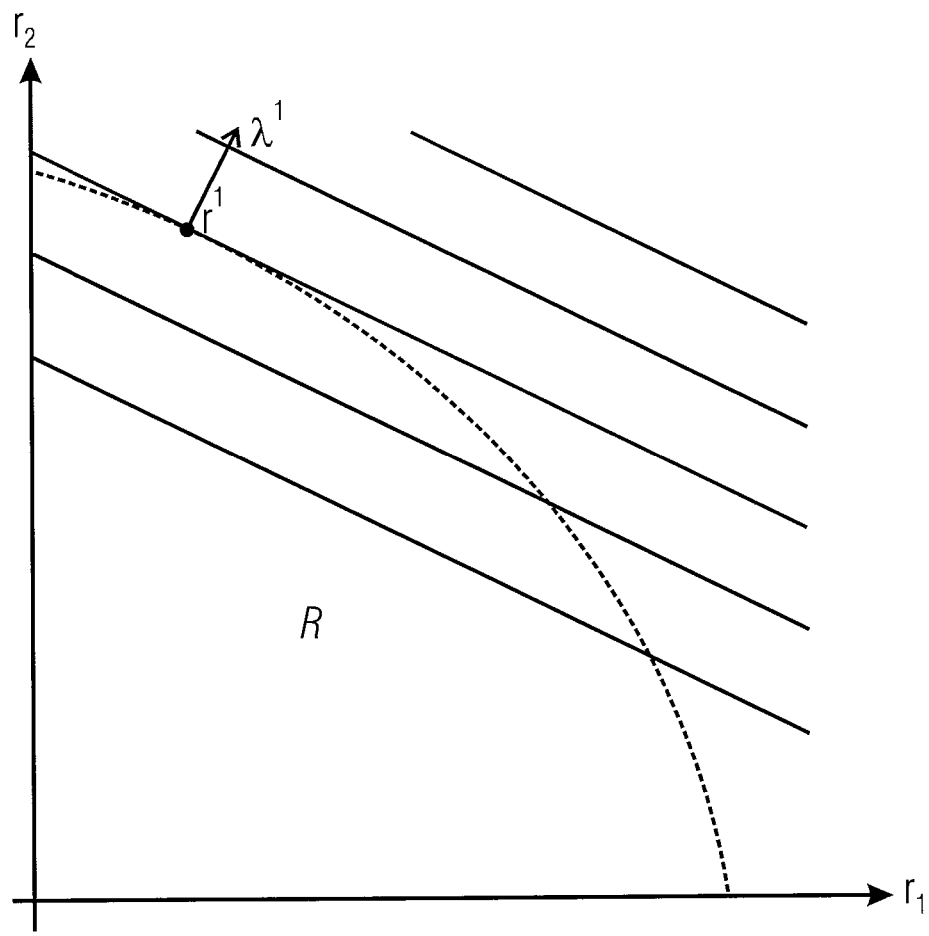
Figure 4F:
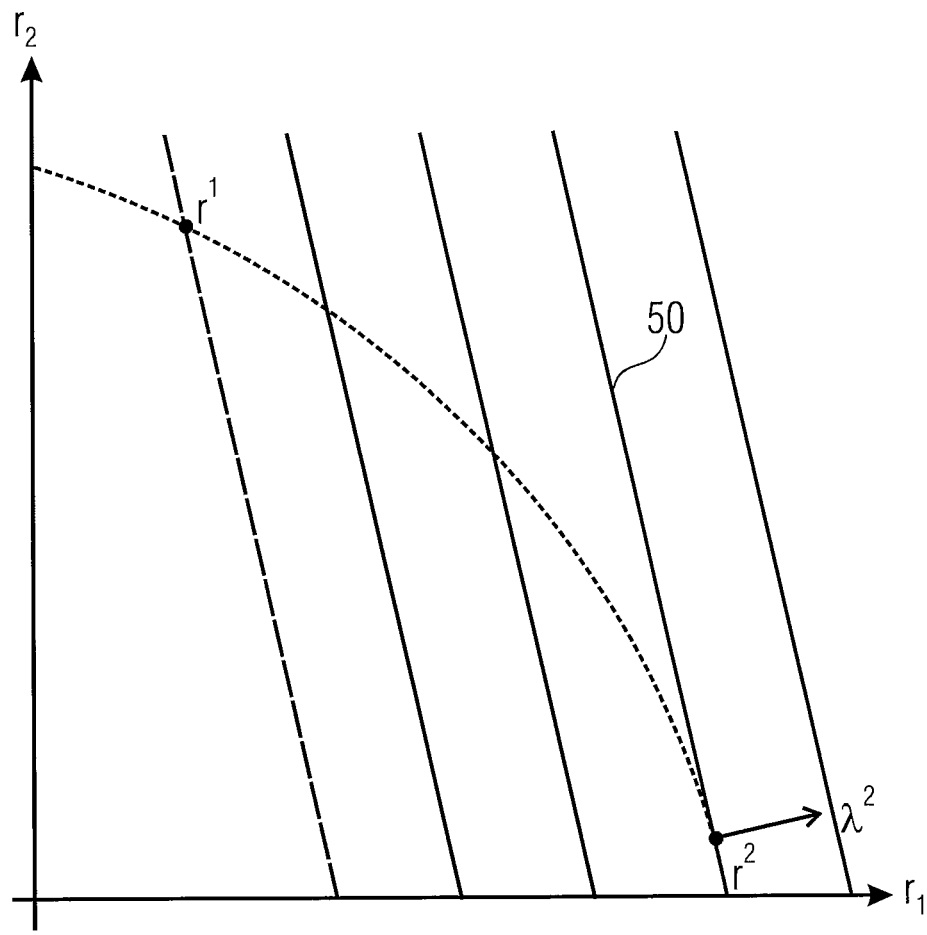
Figure 4G:
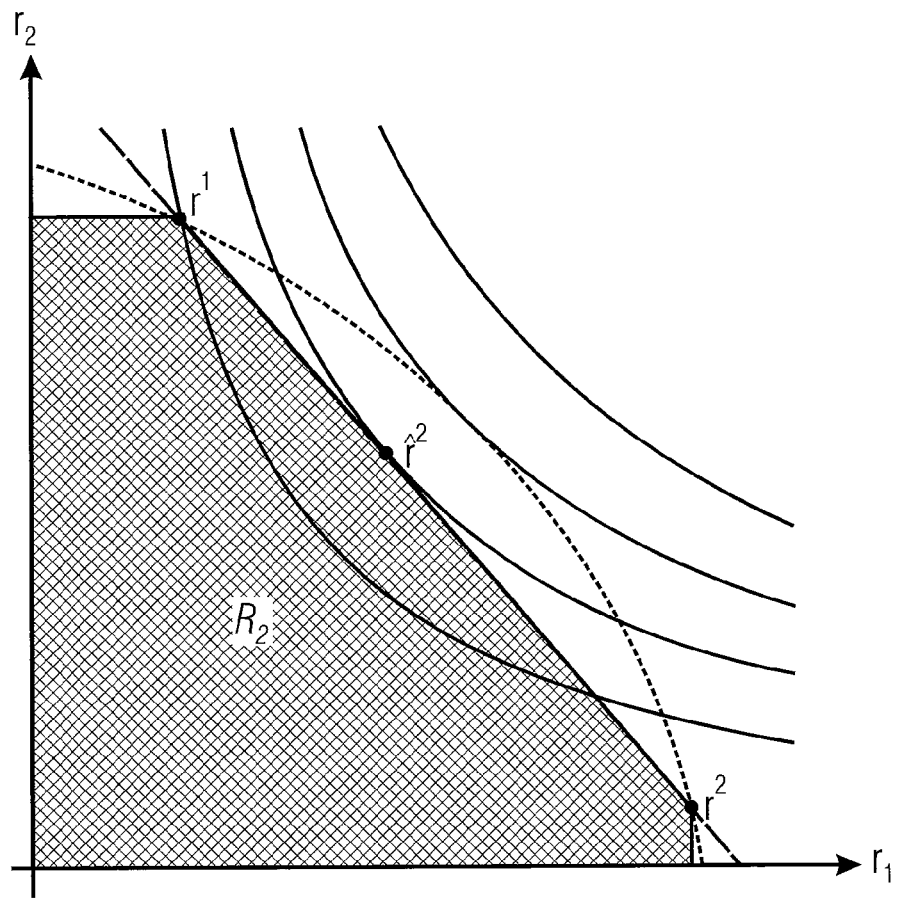

FIG. 4D illustrates a first iteration step with a weighted sum-rate optimization. Here, the rate region is again indicated and the first iteration result is found at $r^1$ having associated update weights $\lambda^1$. Now, as illustrated in FIG. 4E, an inner approximation of the rate region is performed. The update step is illustrated in FIG. 4E. Now, in FIG. 4F, iteration 2 is performed, but now with the different λ calculated in FIG. 4E which means that the point where the line 50 touches the rate region R is determined, and this point corresponds to $r^2$. Now, as illustrated in FIG. 4G, again an inner approximation of the rate region is performed, and in iteration 2, $r^2$ is calculated as a weighted combination of $r^1$ and $r^2$ as determined in the two earlier iteration steps, and this $r^2$ is now used to finally calculate the new $\lambda^3$ so that the λ-update is based on the weighted combination of the resources allocation results for the iteration step and for at least one earlier iteration step.

Figure 4H:
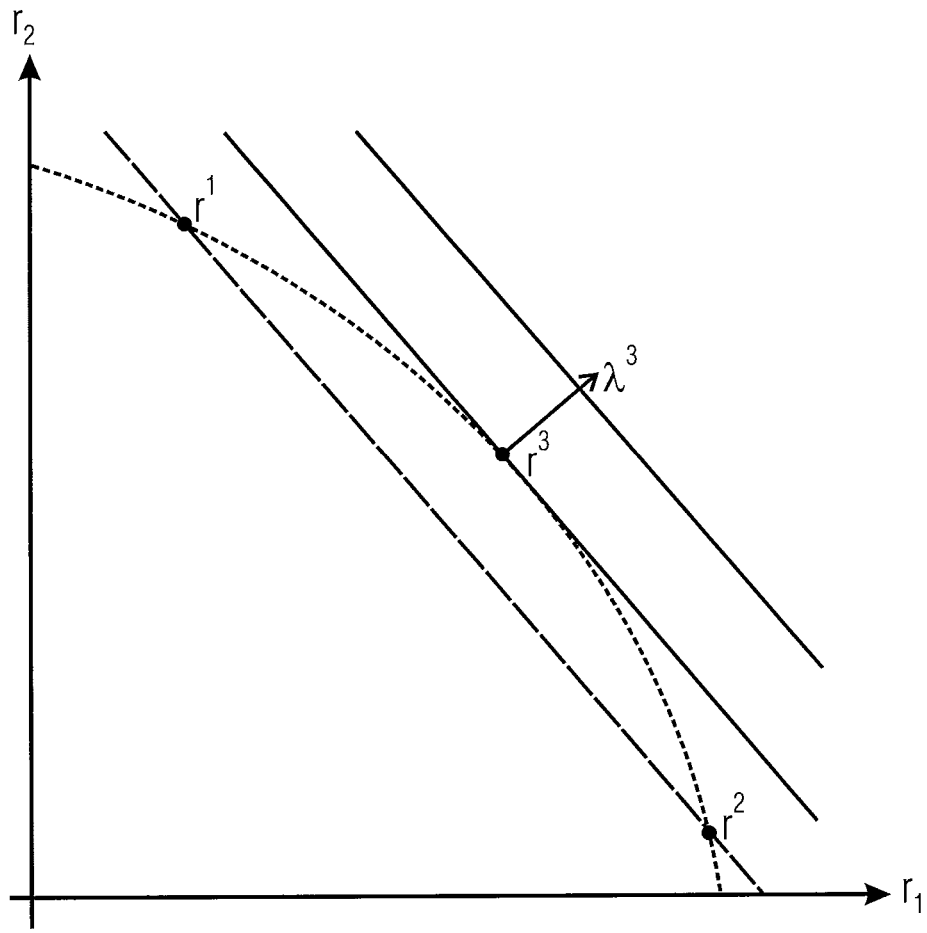
Figure 4I:
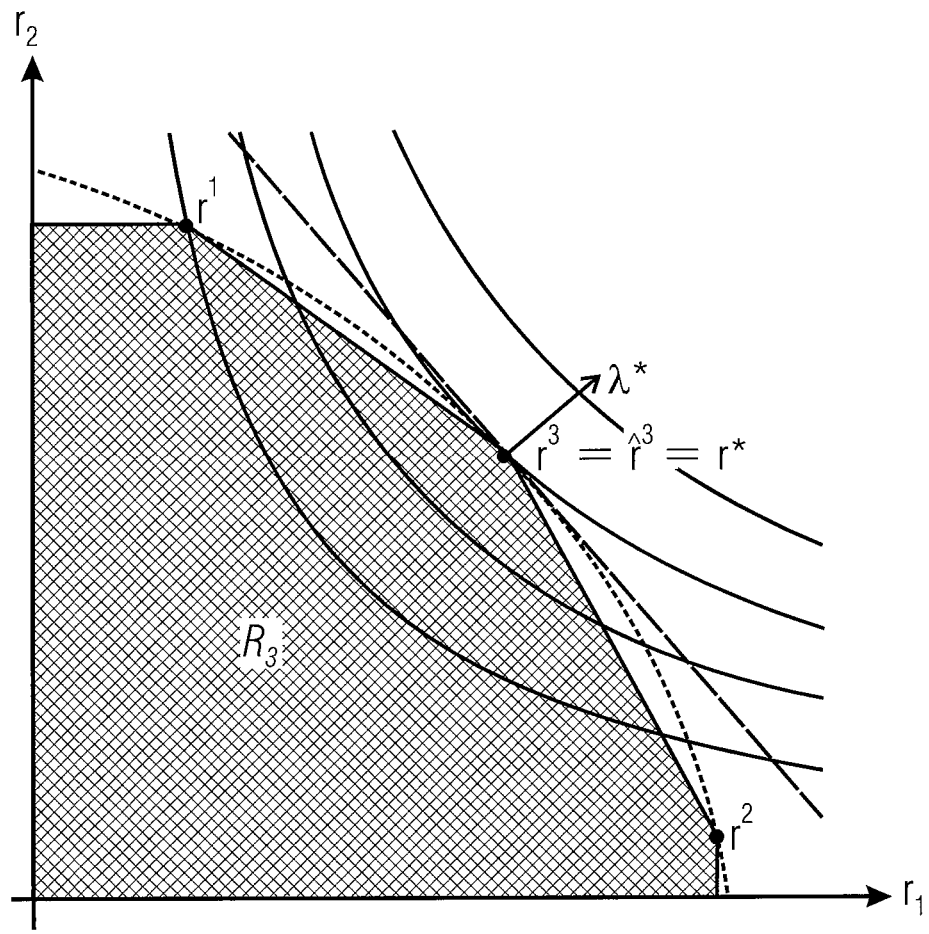

Now, as illustrated in FIG. 4H, iteration 3 results in $r^3$. Stated differently, $\lambda^3$ is calculated in FIG. 4G and the point where a line having an inclination determined by $\lambda^3$ touches the rate region is determined in FIG. 4H. Hence, the result of the third iteration is $r^3$. As illustrated in FIG. 4I, the iteration is now completed, since no improved result can be obtained.

Subsequently, reference is made to simulation results, particularly with reference to FIGS. 9B and 9C. The scenario investigated is a multi-user MIMO system, where a single base station equipped with 4 antennas serves K=10 users with 4 antennas each. The channel is assumed to be time variant but constant within one time-slot of 0.5 ms, the length of a time-slot in LTE [26]. One assumes the channel is perfectly known at transmitter and receivers and there is a peak power constraint, which implies that power budgets cannot exchanged among the time-slots, as for an average power constraint. We assume that the transmitter has the capabilities to support all rates in the MIMO BC capacity region, for which efficient methods for WSR maximization are available.

Although the method is applicable to all three definitions of the average throughput, see FIG. 10C, for the numerical simulations one investigates the performance for a fixed window size. That is, one wants to optimize the utility U($\bar{r}$[T]) for a fixed T. To this end, the parameters for the predictive proportional fair algorithm are chosen as $B_t$=t, $P_t$=T−t+1 and $w_t$=1/T, that is all past allocations in the window are considered, the rate regions for all remaining time-slots are predicted and each time-slot has the same weight.

The channel coefficients of a user k depend on long term shadow fading that is log-normal distributed with mean $\mu_k$ and variance $\sigma_k$. The shadowing is independent for the users but the same for all channel coefficients of a user. The shadow fading is assumed to be constant within the window size regarded. The time variance of the channel coefficients is due to independent microscopic fading (Rayleigh fading), that depends on the mobility of the users.

Two scenarios are shown: one with homogeneous users where $\sigma_k$=0 dB for all users and one with heterogeneous users, where $\sigma_k$=4 dB for all users. The shadow fading mean is 0 dB in all cases.

An average over 100 windows is used, where channel realizations within one window are correlated, the realizations in different windows are independent. All users have an infinite backlog of traffic but the window length T is used to guarantee a fair share of service within a finite time window.

As a reference are used:

Maximum Throughput

Maximum throughput can be easily achieved causally by simple maximizing the sum-rate in each time-slot.

Max-Min Fairness

For max-min fairness we maximized the minimum rate of all users in every time-slot, which can be done by solving a utility maximization problem.

Non-Causal Upper Bound

The non-causal upper bound is found by assuming all channel realizations are known in advanced. In this case the utility optimal schedule, i.e., the optimal rate allocation for each time-slot can be computed.

Proportional Fair Per Slot

In this case proportional fairness is established in every time-slot, ignoring the past allocations and without considering a prediction.

Gradient Scheduler

Our numerical simulations show that the gradient scheduler clearly outperforms the stochastic subgradient and the queuing method and we therefore do not include them.

Predictive Proportional Fair Multi-User Scheduler (P-PF)

To evaluate performance the definition of the T normalized Doppler frequency is used as introduced in [20]. A small normalized Doppler frequency means that the channels hardly varies within the application time window, leaving little gains for the scheduler from being opportunistic. FIG. 9b shows the performance of the presented methods in both the proportional fair utility and sum throughput for the homogeneous scenario. As expected, for increasing variation of the channel within the application time frame the gradient and the max-throughput scheduler converge to the upper bound. The same can be observed for the novel method (P-PF), which outperforms the state of the art methods with large gains for small normalized Doppler frequency. We can verify the conclusions in [18] that to achieve long term fairness a less involved algorithm can be used, but a predictive scheduler is of significant benefit in scenarios with tighter fairness and delay constraints.

The results for the heterogeneous scenario are shown in FIG. 9c. First one notices the starvation of users in case the maximum throughput scheduler is used and therefore the fairness utility is minus infinity, meaning one has to sacrifice some of the throughput to achieve fairness. However, as in the first scenario the novel method outperforms all existing methods. The most competitive is the proportional fair per timeslot, which has similar complexity. The gradient scheduler is asymptotically optimal but scarifies drastically in case employed in scenarios with finite time frames.

Subsequently, further aspects of the present invention are discussed with reference to FIGS. 6 to 9a.

The present invention provides a concept for multi-cell MIMO communications incorporating robust cooperative transmission strategies. Particularly, the robust cooperative transmission allows that users may be disconnected for several consequent transmission intervals, the goal is a robust strategy with short term fairness and the solution is a predictive multi-user scheduling.

The predictive multi-user scheduling relates to a downlink transmission for stochastic networks with time variant channels and for advanced multi-user transmission (MU-MIMO). Gains can be obtained by opportunistic resource allocation, but one can also observe a starvation of users. Hence, there has to be a trade-off between maximum throughput on the one hand and fairness on the other hand. The goal is an opportunistic and fair resource allocation. Proportional fairness in multi-user MIMO systems or advanced multi-user systems is related to the connection of proportional fairness and utility maximization. In an embodiment, the gradient algorithm is preferred serving as a generalized proportional fairness scheduling for multi-user systems.

FIG. 6 illustrates a scenario for which the present invention provides a solution. FIG. 6 illustrates past time slots 1, 2, a current time slot 3 and an unknown future time slot 4 and a unknown future time slot 5. Furthermore, each time slot has its associated channel description H[1] for time slot 1, for example. An average throughput cannot be optimized directly. This is due to the fact that the rate allocations of the past r[1], r[2] cannot be changed.

Furthermore, the future channels H[4], H[5] are unknown and the channels H[3] and the current time slot are known. Hence, only the rates r[3], which are in rate region for the current slot 3, can be allocated.

FIG. 7A illustrates the state-of-the-art solution relying on the gradient algorithm. It provides an asymptotically optimal selection rule (long term average), but one has a drastic performance degradation for finite window length or sliding window. Particularly, the gradient algorithm receives, as an input, the past rate allocations and the rate region for the current time slot. Particularly, the rate region of the current time slot is generated out of the channel description H[3] for the current time slot. Based on this input, the gradient algorithm determines the transmission resources r[3] for the current time slot. However, the future is unknown and is not considered by the gradient algorithm.

FIG. 7B illustrates a further approach, which relies on the channel prediction. Particularly, the future channels for time slots 4 and 5 are predicted using the past channels H[1] and H[2]. Furthermore, based on the channel for the current time slots, the rate region for the current time slot is calculated. Furthermore, approximated rate regions are calculated from the predicted channels. Then, all of the rate regions for the past time slots and the future time slots and the current time slot are input into a predictive scheduler and the scheduler then schedules for the current time slot, i.e. determines the transmission resource r[3] for the exemplary current time slot 3 for all users as for example illustrated in FIG. 2 for several cells/base stations. To this end, the problem indicated in FIG. 7b is addressed, i.e. the utility is maximized and the result of this maximization is not only the overall transmission resources sum r, but also the transmission resources r[3] for the current slot and r[4] and r[5] for the future time slots. However, the rate regions for the future time slots found by the maximization are only calculated by the algorithm but are not used. Instead, these are only a "side product", but for the next time slot, i.e. when time slot 4 is the current time slot, a new value is calculated for time slot 4 which no longer depends on the earlier calculated transmission resources for time slot 4, where time slot 4 was the future time slot.

However, this approach is problematic due to the fact that an MIMO channel prediction has to be performed and a high complexity is required for performing the complex mapping of the channel state to the rate region as indicated at the right of FIG. 7B.

Figure 8A:
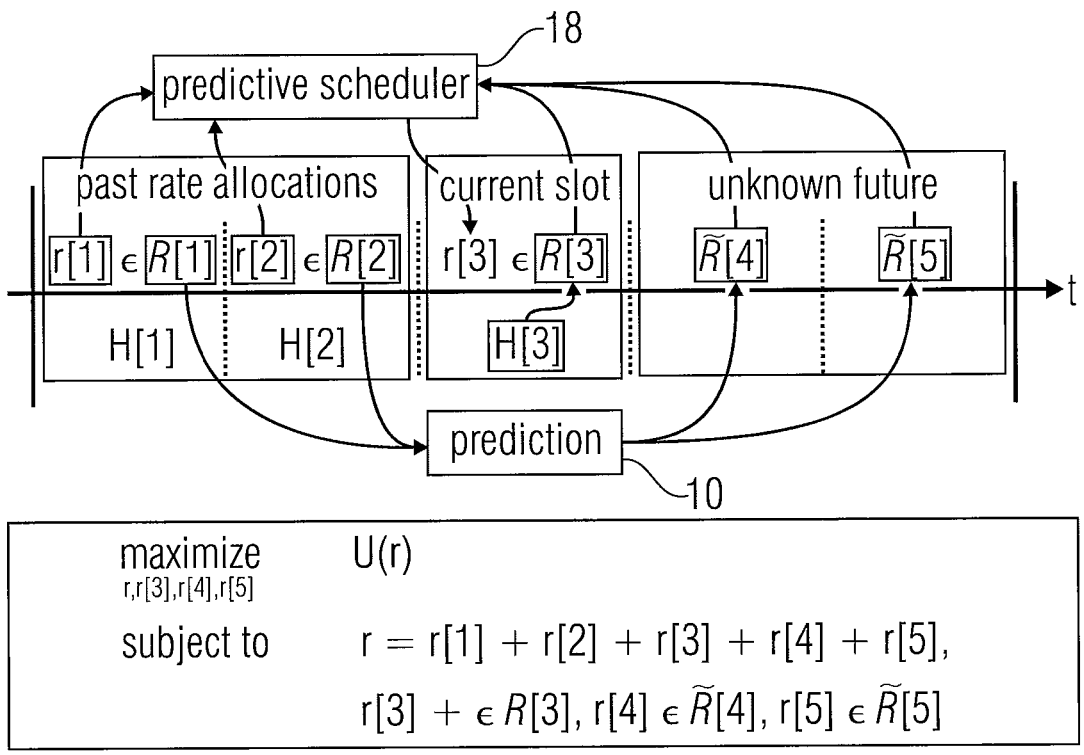
FIG. 8A illustrates an inventive scheduling with a rate region prediction.

In order to address all of these problems, the inventive concept as illustrated in FIG. 8A is applied, which relies on a prediction of the future rate regions based on the past rate regions. The prediction is performed by the predictor 10 of FIG. 1, and the functionality of the predictive scheduler is performed by the processor 18 in FIG. 1. The predictor 10 can be implemented in many different ways. One straightforward implementation would be to use the rate region R[1] of a past time slot as the predicted rate region R[4] of the future time slot and to use the rate region of the other past time slot 2 for the predicted rate region of the future time slot. Hence, the prediction can rely on copying the past rate regions to predicted rate regions or using past rate regions as predicted rate regions. It is preferred to perform this kind of prediction so that the sequence of rate regions is maintained, i.e. the earliest past time slot rate region is predicted to the latest future time slot, i.e. in the embodiment in FIG. 8A, the rate region for slot 2 is predicted and used for the rate region of slot 5. Furthermore, it is preferred to use the latest past rate region as a prediction for the earliest future rate region. Hence, a rate region for slot 1 is predicted, i.e. used as the rate region for slot 4. Hence, the sequence of rate regions is maintained.

However, other prediction methods can be applied as well. For example, there can be a prediction as known from linear prediction coding of speech, where prediction coefficients are calculated and the predicted rate region is a weighted sum of the earlier rate regions, where the weights for the sum are determined by a linear prediction concept. Additionally, other ways of calculating the rate regions for the future based on the rate region for the past can be used as well.

Hence, the optimization problem solved by the present invention is that the utility U(r) is maximized where the sum of the rates is variable and the rates for the current and the two future time slots are variable as well. The constraint is that the transmission resources have to be in the rate regions for the current and the future time slots as indicated in FIG. 8A. Preferably, the solution is provided by an inner approximation of the rate regions and these inner approximations are preferably used for the prediction in the rate space as outlined before.

FIG. 8B illustrates a more detailed embodiment indicating two different rate regions for the past time slot 1 and the past time slot 2, where an example for two different users 1 and 2 is given, and where it can be seen that the rate region can actually change very much from one time slot to another time slot.

Furthermore, it is preferred to actually calculate the user's transmission resources r1 and r2 using the logic discussed in the context of FIGS. 4A to 4F, which is disclosed in detail in the non-published European patent application No. EP10191589.0, which is incorporated herein by reference.

Furthermore, it is preferred to store the parameterized approximation of the rate region by the points indicated by the transmission resources $r_1$, $r_2$ and the axis points 37a, 37b. In implementations, however, the points 37a, 37b are not necessarily required, since all of the information is provided in the complete transmission resources found by an optimization in a certain rate region. Hence, the transmission resources themselves form an approximation of the rate region and it is preferred to use the earlier assigned transmission resources as the approximations for the rate regions to be used by the predictive scheduler on the one hand and to be used by the predictor on the other hand in a particularly efficient implementation.

Hence, the rate regions are approximated by the optimization results of earlier steps which are located on boundary points of the rate regions. It has been found that using the inner approximations instead of the rate regions themselves provides a great advantage with respect to complexity, but is not decisive with respect to the accuracy of the determination of the transmission resources for the current time slot.

Figure 9A:
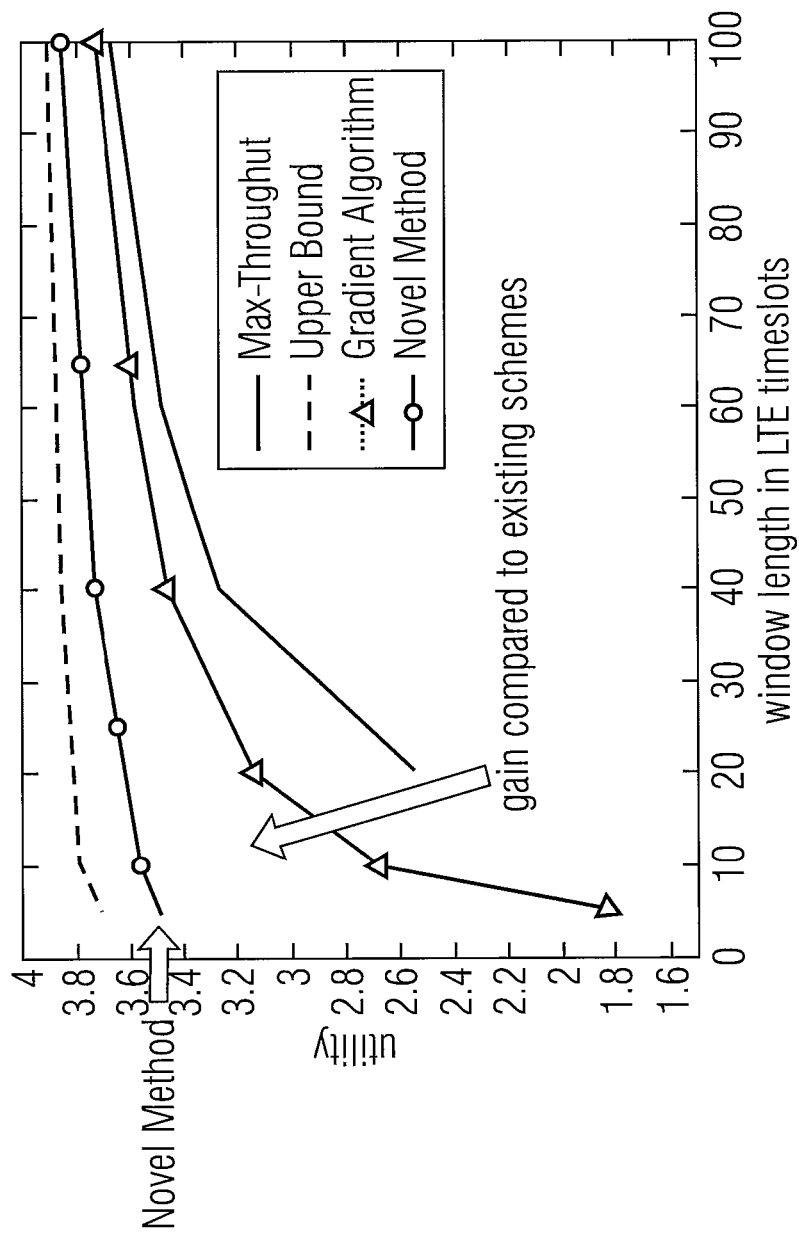

FIG. 9A illustrates a further simulation result indicating the significant gain provided by the novel method illustrated in FIG. 8B compared to existing schemes, even though the prediction has been implemented in a straightforward manner and more advanced prediction concepts can be used as well.

The present invention therefore provides predictive scheduling in the rate space. Preferably, inner approximations of rate regions are stored, and the prediction is used based on inner approximations and therefore the complexity and storage requirements can be drastically reduced and only a marginal increase in complexity compared to a gradient scheduler is obtained, but a significant gain with respect to throughput and fairness performance.

Regarding FIG. 9A, a setup of 4×4 MIMO has been applied. Furthermore, 10 mobile users have been implemented in the simulation. Furthermore, correlated Rayleigh fading (Jakes' model, vehicular users) has been used. Furthermore, the same channel statistics for all users have been introduced into the simulation. The algorithms are the max-throughput algorithm, the gradient algorithm, the upper bound (perfect prediction) algorithm and the predictive scheduling algorithm, i.e. the algorithm in accordance with the present invention has been applied, and this algorithm out performs all other algorithms except of course the upper bound algorithm which has a perfect prediction as a precondition.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An apparatus for scheduling transmission resources to users served by a base station equipped with a plurality of antennas, comprising:
   a computer that executes a predictor to determine rate regions for one or more future time slots, the rate regions determined for the one or more future time slots based on rate regions for one or more past time slots; and
   a processor to allocate the transmission resources of the base station for the users for a current time slot using scheduled transmission resources for the one or more past time slots, a rate region for the current time slot, and the rate regions determined for the one or more future time slots.

2. The apparatus of claim 1, wherein the processor is configured to determine the transmission resources for the current time slot by optimization of use of the current time slot, the optimization comprising an optimization target, wherein the optimization target is based on a weighted or unweighted sum of the transmission resources from the one or more past time slots, the current time slot and the one or more future time slots.

3. The apparatus of claim 2, wherein the processor is configured to determine, as the optimization target, a maximization of usefulness of the current time slot based on the weighted or unweighted sum of the transmission resources for the one or more past time slots, the current time slot and the one or more future time slots.

4. The apparatus of claim 1, wherein the rate regions determined for the one or more future time slots are determined by the computer to be equal to the rate regions for the one or more past time slots, and a sequence of the rate regions for the one or more past time slots is maintained by the computer in the rate regions determined for the one or more future time slots.

5. The apparatus of claim 1, wherein the processor is configured to allocate the transmission resources for the current time slot so that the transmission resources are within the rate region for the current time slot based on estimated transmission resources for the one or more future time slots being within the rate regions for the one or more future time slots.

6. The apparatus of claim 1, wherein the computer executes the predictor to store information on the rate region for the one or more past time slots.

7. The apparatus of claim 1, wherein the processor is configured to determine transmission resources for the one or more future time slots in addition to allocation of the transmission resources for the current time slot, and
wherein the processor is configured to allocate a transmission resource or a time slot immediately following in time to the current time slot without use of the determined transmission resources for the one or more future time slots.

8. The apparatus of claim 1, wherein the processor is configured to allocate the transmission resources for the current time slot based on a weighted sum of transmission resources for the one or more past time slots, the current time slot, and the one or more future time slots being within a weighted average rate region depending on rate regions for the one or more past time slots, the current time slot and the one or more future time slots, wherein weighting factors for the one or more past time slots and the one or more future time slots adjust an influence of the past and future one or more time slots.

9. The apparatus of claim 1, wherein the processor is configured to update an estimate of the transmission resources for the current time slot based on a sequence of weighted sum rate optimizations.

10. The apparatus of claim 9, wherein the processor is configured to store and use inner approximations of rate regions for the one or more past time slots, the inner approximations being determined by the processor in addition to transmission resources for the one or more past time slots.

11. The apparatus of claim 1, wherein the apparatus is configured for a multi-user MIMO system wherein the base station is equipped with a plurality of antennas and each user is equipped with a single or more antennas.

12. The apparatus of claim 1, wherein the processor is configured to use a peak power constraint as an optimization boundary so that power budgets cannot be exchanged among time slots.

13. The apparatus of claim 1, wherein the predictor executable with the computer and the processor are configured to operate using a window comprising a time size, the time size comprising the one or more past time slots, the current time slot and the one or more future time slots, and
wherein for allocation of transmission resources for a further time slot later in time than the current time slot, the window is placed so that the further time slot is positioned in the window and the window comprises at least one past time slot and at least one future time slot.

14. The apparatus of claim 1, wherein the processor is configured to apply a proportional fairness utility in solving an optimization problem.

15. A method of scheduling transmission resources to users served by a base station equipped with a plurality of antennas, comprising:
determining, with a computer, rate regions for one or more future time slots based on rate regions for one or more past time slots to acquire one or more predicted rate regions; and
allocating, with the computer, the transmission resources of the base station for the users for a current time slot using scheduled transmission resources for the one or more past time slots, a rate region for the current time slot and the one or more determined rate regions.

16. A non-transitory digital storage medium comprising instructions executable on a computer to perform scheduling of transmission resources to users served by a base station equipped with a plurality of antennas, said digital storage medium comprising:
instructions executable on the computer to determine rate regions for one or more future time slots based on rate regions for one or more past time slots to acquire one or more predicted rate regions; and
instructions executable on the computer to allocate the transmission resources of the base station for the users for a current time slot using scheduled transmission resources for the one or more past time slots, a rate region for the current time slot and the one or more predicted rate regions.

* * * * *